US008427453B2

(12) United States Patent
Su et al.

(10) Patent No.: US 8,427,453 B2
(45) Date of Patent: Apr. 23, 2013

(54) OPTICAL SENSING SYSTEM

(75) Inventors: Tzung-Min Su, Hsin-Chu (TW);
Chih-Hsin Lin, Hsin-Chu (TW);
Hsin-Chia Chen, Hsin-Chu (TW);
Cho-Yi Lin, Hsin-Chu (TW)

(73) Assignee: PixArt Imaging Inc., Science-Based Industrial Park, Hsin-Chu (TW)

( * ) Notice: Subject to any disclaimer, the term of this patent is extended or adjusted under 35 U.S.C. 154(b) by 262 days.

(21) Appl. No.: 13/087,392

(22) Filed: Apr. 15, 2011

(65) Prior Publication Data
US 2011/0193823 A1    Aug. 11, 2011

Related U.S. Application Data

(63) Continuation-in-part of application No. 12/632,796, filed on Dec. 8, 2009, and a continuation-in-part of application No. 12/550,681, filed on Aug. 31, 2009, now Pat. No. 8,131,502, which is a continuation-in-part of application No. 12/249,222, filed on Oct. 10, 2008, now Pat. No. 7,689,381, application No. 13/087,392, which is a continuation-in-part of application No. 12/632,808, filed on Dec. 8, 2009, now Pat. No. 8,135,561, which is a continuation-in-part of application No. 12/249,222.

(30) Foreign Application Priority Data

| Jul. 10, 2008 | (TW) | 97126033 A |
| Feb. 11, 2009 | (TW) | 98104392 A |
| Sep. 17, 2009 | (TW) | 98131423 A |
| Oct. 28, 2009 | (TW) | 98136583 A |
| Oct. 20, 2010 | (TW) | 99135761 A |

(51) Int. Cl.
*G06F 3/042* (2006.01)

(52) U.S. Cl.
USPC .............. 345/175; 178/18.09; 178/18.11

(58) Field of Classification Search .............. None
See application file for complete search history.

(56) References Cited

U.S. PATENT DOCUMENTS

| 4,507,557 A | 3/1985 | Tsikos |
| 4,782,328 A | 11/1988 | Denlinger |
| 6,803,906 B1 | 10/2004 | Morrison |
| 7,689,381 B2 | 3/2010 | Lin |
| 2004/0149892 A1* | 8/2004 | Akitt et al. .............. 250/221 |
| 2005/0243070 A1* | 11/2005 | Ung et al. .............. 345/176 |
| 2009/0244018 A1* | 10/2009 | Lin et al. .............. 345/173 |

* cited by examiner

Primary Examiner — Adam R Giesy
(74) Attorney, Agent, or Firm — Winston Hsu; Scott Margo

(57) ABSTRACT

An optical sensing system includes a sensing area, a reflective mirror, a first image-sensing device, a second image-sensing device, and a processing circuit. The sensing area is an area in which a plurality of pointing objects may execute touch operation. The reflective mirror generates a mirror image of the sensing area. The first image-sensing device and the second image-sensing device respectively capture images including all or part of the pointing objects in the sensing area, and all or part of the pointing objects in the reflective mirror. The processing circuit generates candidate coordinates according to the images captured by the first and the second image-sensing devices, and obtains the locations of the pointing objects from the candidate coordinates by means of the symmetric relationship between the point objects and the corresponding mirror images with respect to the reflective mirror. In this way, the optical sensing system can perform multi-touch operation.

24 Claims, 25 Drawing Sheets

OPTICAL SENSING SYSTEM

CROSS REFERENCE TO RELATED APPLICATIONS

This application is a continuation-in-part of U.S. application Ser. No. 12/632,796 filed on Dec. 8, 2009, and U.S. application Ser. No. 12/550,681 filed on Aug. 31, 2009 and U.S. application Ser. No. 12/632,808 filed on Dec. 8, 2009, both of which are continuations-in-part of U.S. application Ser. No. 12/249,222 filed Oct. 10, 2008, now U.S. Pat. No. 7,689,381, the contents of which are incorporated by reference herein.

BACKGROUND OF THE INVENTION

1. Field of the Invention

The present invention is related to touch operation technique, and more particularly, to an optical sensing system with multi-touch operation functionality.

2. Description of the Prior Art

Please refer to FIG. 1. FIG. 1 is a diagram illustrating a conventional optical sensing system 100. The optical sensing system 100 is utilized for detecting a location of a pointing object 102. The optical sensing system 100 includes a sensing area 116, a reflective mirror 104, an image-sensing device 110, and a processing circuit 112. Reflective components 106 and 108 are disposed on the sides of the sensing area 116. The reflective components 106 and 108 reflect light toward the sensing area 116. The reflective mirror 104 generates a mirror image of the sensing area 116. The reflective mirror 104 can be realized with a planar mirror. A mirror surface 118 of the reflective mirror 104 faces the sensing area 116. The image-sensing device 110 is disposed at a corner of the sensing area 116, and sensing range of the image-sensing device 110 includes the sensing area 116. The processing circuit 112 calculates the location of the pointing object 102 according to the image captured by the image-sensing device 110, so as to generate output coordinates $S_{XY}$.

Please refer to FIG. 2. FIG. 2 is a diagram illustrating operating principles of the optical sensing system 100. In FIG. 2, the part above the reflective mirror 104 represents the mirror image generated by the reflective mirror 104. More particularly, the reflective mirror 104 generates a mirror image 106A of the reflective component 106, a mirror image 108A of the reflective component 108, a mirror image 110A of the image-sensing device 110, a mirror image 116A of the sensing area 116, and a mirror image 102A of the pointing object 102. It can be seen in FIG. 2 that the image-sensing device 110 senses the pointing object 102 through the optical path 204, and senses the pointing object 102A in the reflective mirror 104 through the optical path 206. Please refer to FIG. 3. FIG. 3 is a diagram illustrating an image 300 representing the image captured by the image-sensing device 110. Since the image-sensing device 110 is disposed on the left side of the reflective mirror 104, and compared with the dark line 304, the dark line 306 is closer to the left edge of the image 300, the processing circuit 112 accordingly determines that the dark line 304 is the image formed by the pointing object 102, and the dark line 306 is the image formed by the mirror image 102A. In this way, the processing circuit 112 can calculate the location of the pointing object 102 according to the dark line 304 formed by the pointing object 102 and the dark line 306 formed by the mirror image 102A. In addition, the reflective components 106 and 108 and the reflective mirror 104 reflect light to the image-sensing device 110, so that a bright zone 302 is formed in the image 300. The processing circuit 112 can more correctly obtain the location of the dark lines 304 and 306 because of the brightness contrast between the bright zone 302 and the dark lines (304 and 306). Hence, the processing circuit 112 more correctly calculates the location of the pointing object 102.

However, when the optical sensing system 100 is utilized for multi-touch operation, the processing circuit 112 can not determine which dark lines in the image captured by the image-sensing device 110 are formed by the pointing objects and which dark lines in the image captured by the image-sensing device 110 are formed by the mirror images of the point objects. For example, please refer to FIG. 4. FIG. 4 is a diagram illustrating a first situation of the optical sensing system 100 detecting two pointing objects 102 and 103. FIG. 5 is a diagram illustrating a second situation of the optical sensing system 100 detecting two pointing objects 102 and 103. FIG. 6(a) is a diagram illustrating an image 400 captured by the image-sensing device 110 in the first situation shown in FIG. 4. FIG. 6(b) is a diagram illustrating an image 500 captured by the image-sensing device 110 in the second situation shown in FIG. 5. It can be seen in FIG. 6(a) and FIG. 6(b) that the image 400 captured by the image-sensing device 110 in the first situation shown in FIG. 4 is similar to the image 500 captured by the image-sensing device 110 in the second situation shown in FIG. 5. Therefore, the processing circuit 112 can not correctly determine whether the pointing objects 102 and 103 are located as shown in FIG. 4 or as shown in FIG. 5, because the processing circuit 112 can not determine which dark lines in the images 400 and 500 are formed by the pointing objects and which dark lines in the images 400 and 500 are formed by the mirror images of the pointing objects. Therefore, according to the above description, when the optical sensing system 100 is utilized for multi-touch operation, the processing circuit 112 can not correctly calculate the locations of the pointing objects, causing a great inconvenience.

SUMMARY OF THE INVENTION

The present invention provides an optical sensing system. The optical system comprises a sensing area, a reflective mirror, a first image-sensing device, a second image-sensing device, and a processing circuit. The sensing area has a plurality of sides. The plurality of pointing objects executes touch operation within the sensing area. The reflective mirror generates a mirror image of the sensing area. The first image-sensing device captures a first group of real images having all or part of the pointing objects, and a first group of virtual images having all or part of the pointing objects in the reflective mirror. The second image-sensing device captures a second group of real images having all or part of the pointing objects, and a second group of virtual images having all or part of the pointing objects in the mirror image. The processing circuit generates a group of real-image candidate coordinates corresponding to the plurality of pointing objects according to the first group of real images and the second group of real images. The processing circuit generates a group of virtual-image candidate coordinates corresponding to the plurality of pointing objects according to the first group of virtual images and the second group of virtual images. The processing circuit generates a group of output coordinates corresponding to the plurality of pointing objects according to group of real-image candidate coordinates and the group of virtual-image candidate coordinates.

The present invention provides an optical sensing system. The optical system comprises a sensing area, a mirror-surface light-guiding component, a light-emitting component, a first image-sensing device, a second image-sensing device, and a processing circuit. The sensing area has a plurality of sides. The plurality of pointing objects executes touch operation within the sensing area. The mirror-surface light-guiding component has a light-emitting surface facing the sensing area, a mirror surface facing the light-emitting surface and generating a mirror image of the sensing area, and a light-receiving surface. The light-emitting surface emits light to the sensing area when the light-receiving surface receives light. The light-emitting component emits light to the light-receiving surface of the mirror-surface light-guiding component in a light-emitting period. The first image-sensing device captures a first group of real images having all or part of the pointing objects in the light-emitting period, and captures the first group of real images and a first group of virtual images having all or part of the pointing objects in the mirror surface in a non-light-emitting period. The second image-sensing device captures a second group of real images having all or part of the pointing objects in the light-emitting period, and captures the second group of real images and a second group of virtual images having all or part of the pointing objects in the mirror surface in the non-light-emitting period. The processing circuit generating a group of real-image candidate coordinates corresponding to the plurality of pointing objects according to the first group of real images and the second group of real images. The processing circuit generates a group of virtual-image candidate coordinates corresponding to the plurality of pointing objects according to the first group of virtual images and the second group of virtual images. The processing circuit generates a group of output coordinates corresponding to the plurality of pointing objects according to the group of real-image candidate coordinates and the group of virtual-image candidate coordinates.

The present invention provides an optical sensing system. The optical system comprises a sensing area, a reflective mirror, a first image-sensing device, a second image-sensing device, and a processing circuit. The sensing area has a plurality of sides. The plurality of pointing objects executes touch operation within the sensing area. The reflective mirror generates a mirror image of the sensing area. The first image-sensing device captures a first image having all or part of the pointing objects, and a first group of virtual images having all or part of the pointing objects in the reflective mirror. The second image-sensing device captures a second image having all or part of the pointing objects and a second group of virtual images having all or part of the pointing objects in the reflective mirror. The processing circuit generates a first group of blocking lines according to the first image and a location of the first image-sensing device. The processing circuit generates a second group of blocking lines according to the second image and a location of the second image-sensing device. The processing circuit generates a group of candidate coordinates corresponding to the plurality of pointing objects according to the first group of blocking lines and the second group of blocking lines, and generates a group of output coordinates corresponding to the plurality of pointing objects according to the group of candidate coordinates and a location of the reflective mirror.

The present invention provides an optical sensing system. The optical system comprises a sensing area, a reflective mirror, a first image-sensing device, a second image-sensing device, and a processing circuit. The sensing area has a plurality of sides. The plurality of pointing objects executes touch operation within the sensing area. The reflective mirror generates a mirror image of the sensing area. The first image-sensing device captures a first group of real images having all or part of the pointing objects, and a first group of virtual images having all or part of the pointing objects in the reflective mirror. The second image-sensing device captures a second group of real images having all or part of the pointing objects, and a second group of virtual images having all or part of the pointing objects in the reflective mirror. The processing circuit generates a group of a first candidate coordinates corresponding to the plurality of pointing objects according to the first group of real images and the first group of virtual images. The processing circuit generates a group of a second candidate coordinates corresponding to the plurality of pointing objects according to the second group of real images and the second group of virtual images. The processing circuit generates a group of output coordinates corresponding to the plurality of pointing objects according to the group of first candidate coordinates and the group of second candidate coordinates.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
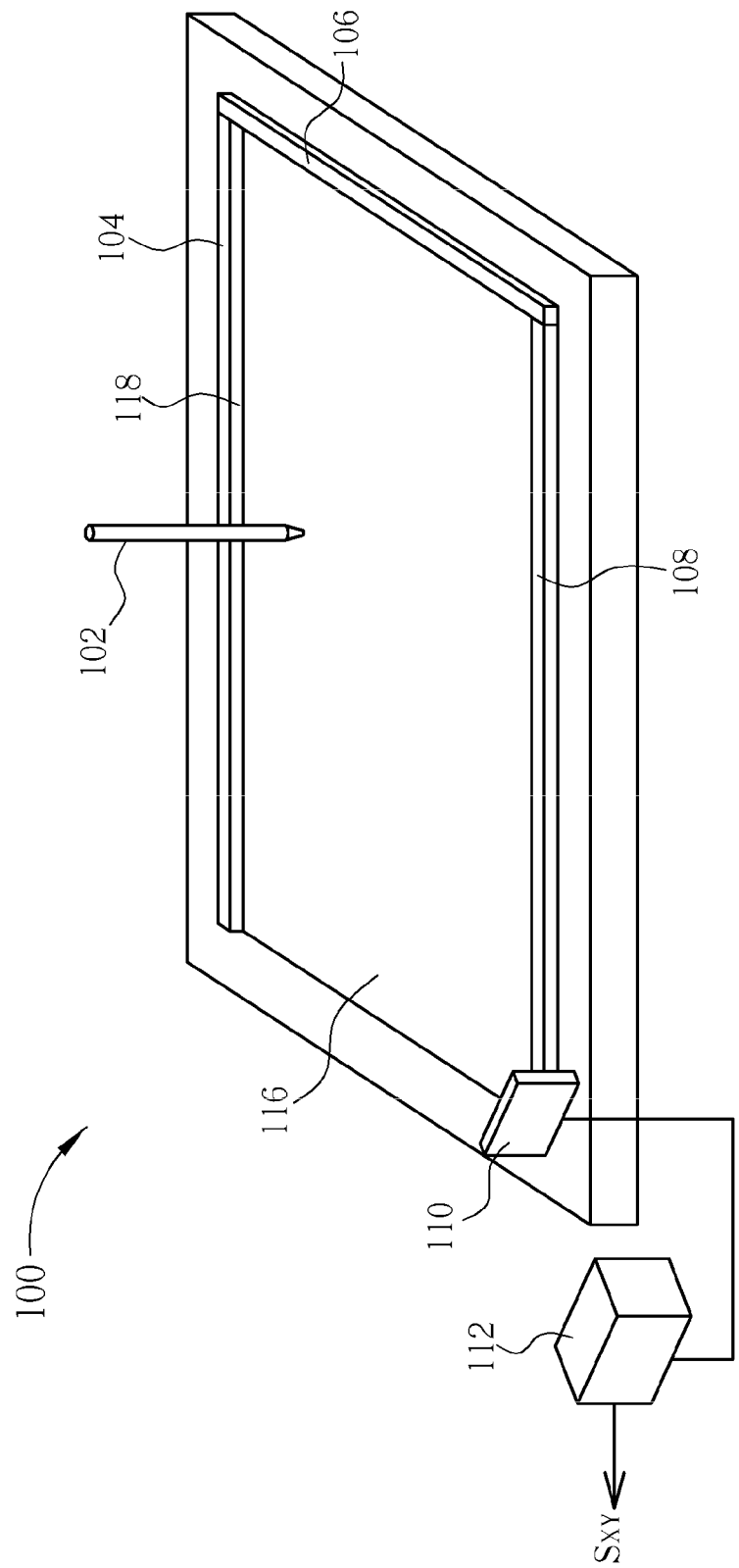
FIG. 1 is a diagram illustrating a conventional optical sensing system.
Figure 2:
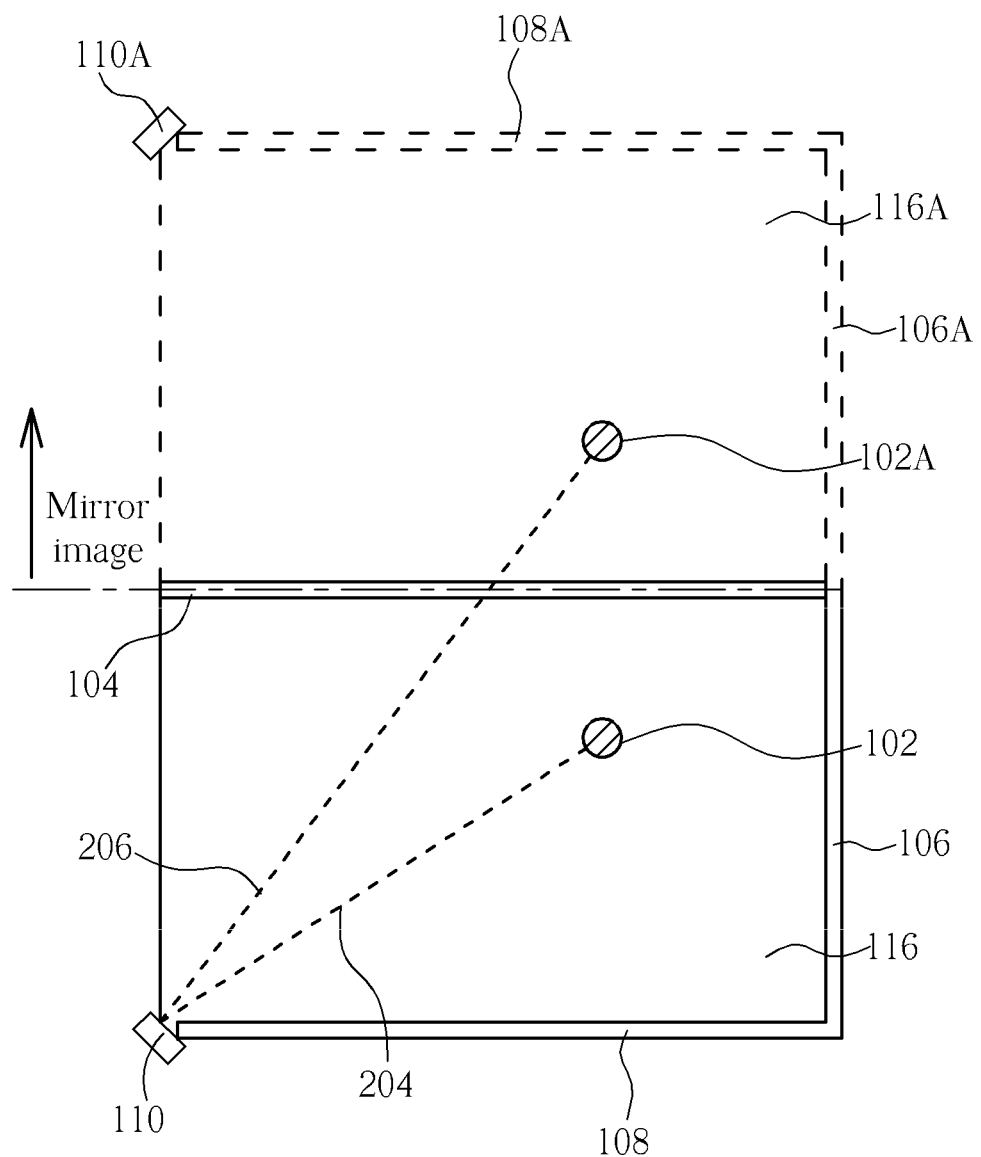
FIG. 2 is a diagram illustrating the operational principle of the optical sensing system.
Figure 3:
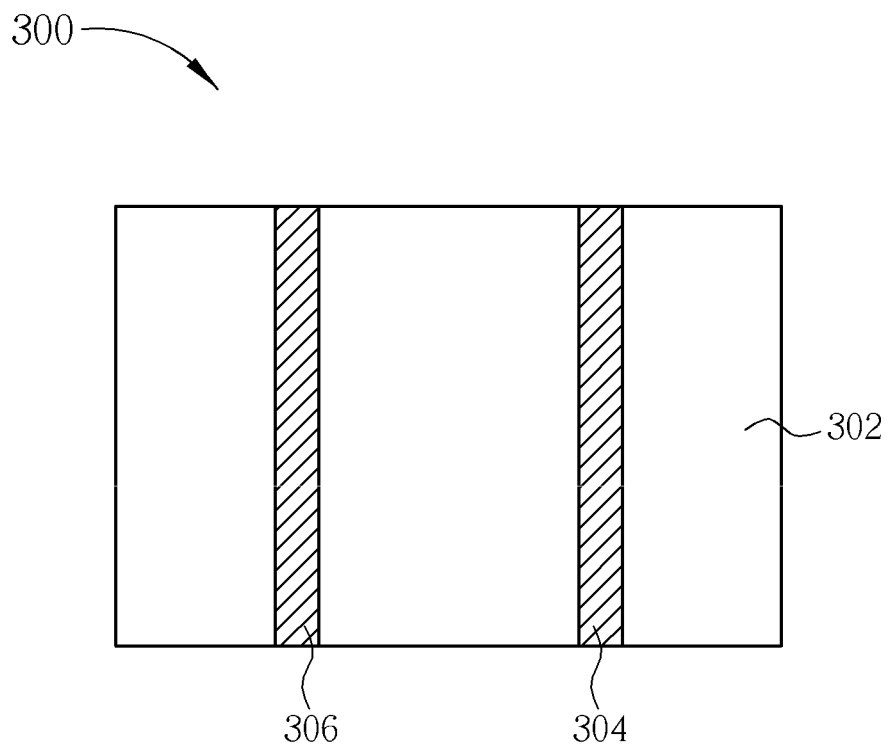
FIG. 3 is a diagram illustrating the image captured by the image-sensing device in FIG. 2.
Figure 4:
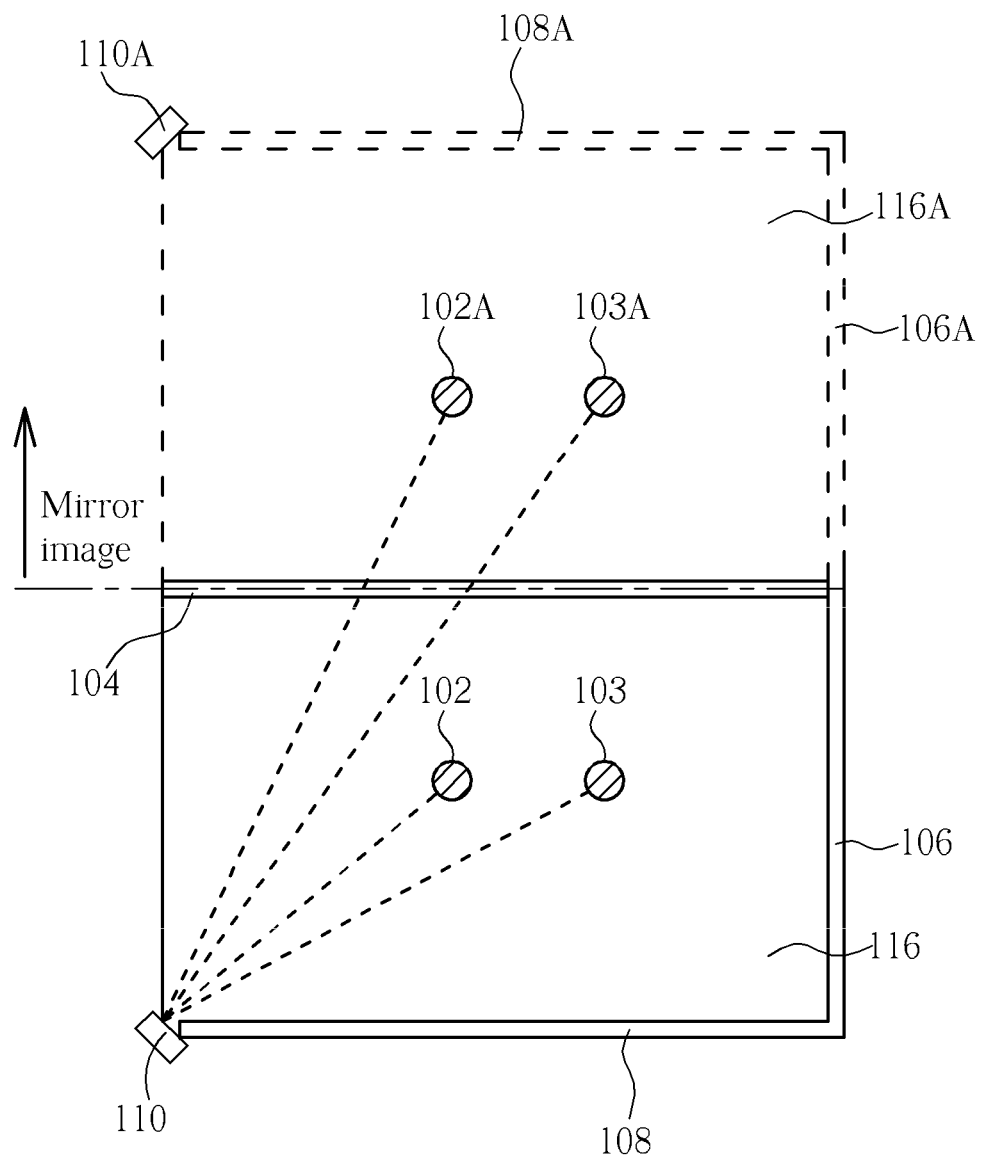
FIG. 4, FIG. 5, FIG. 6(a), and FIG. 6(b) are diagrams illustrating the conventional optical sensing system detecting a plurality of pointing objects.
Figure 5:
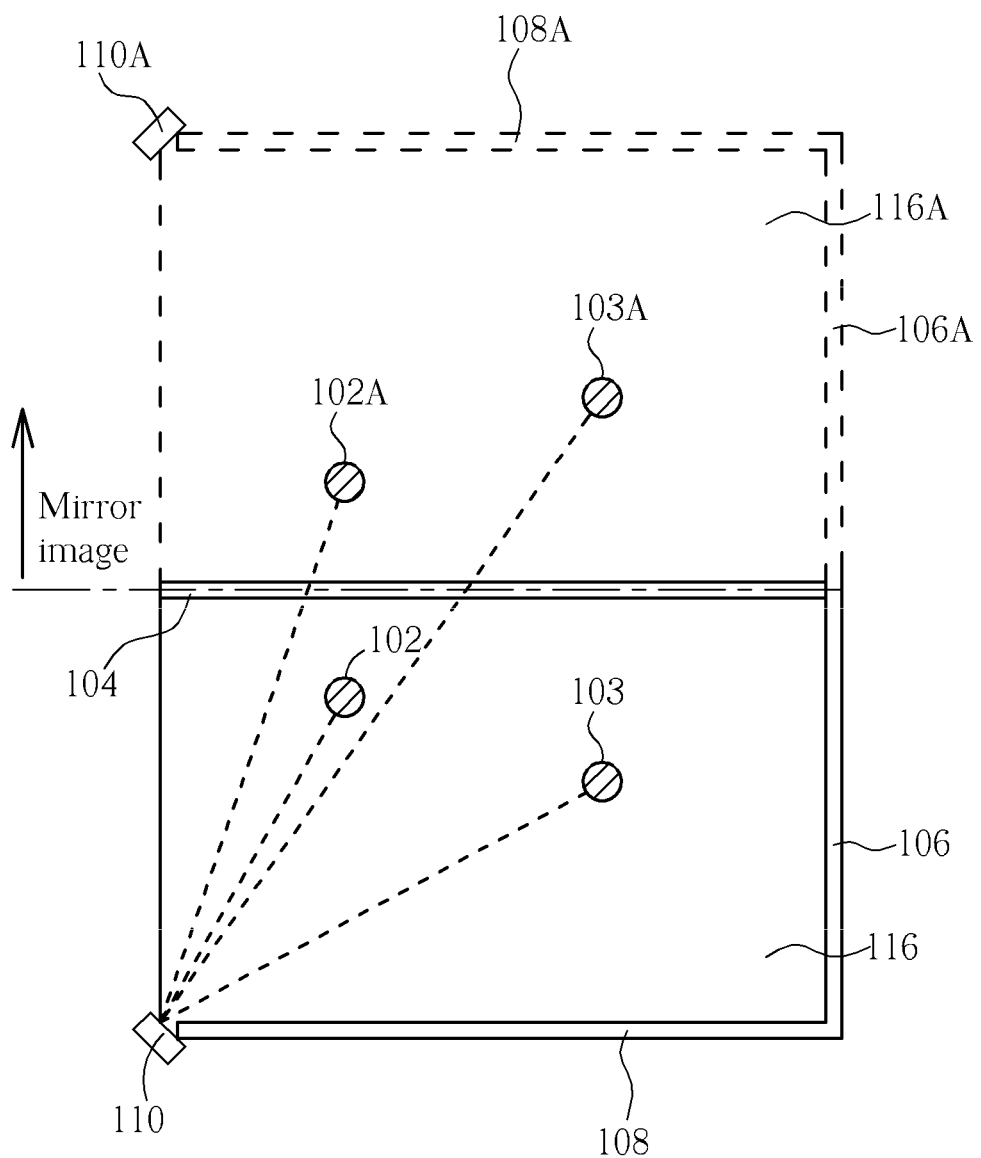
Figure 6A:
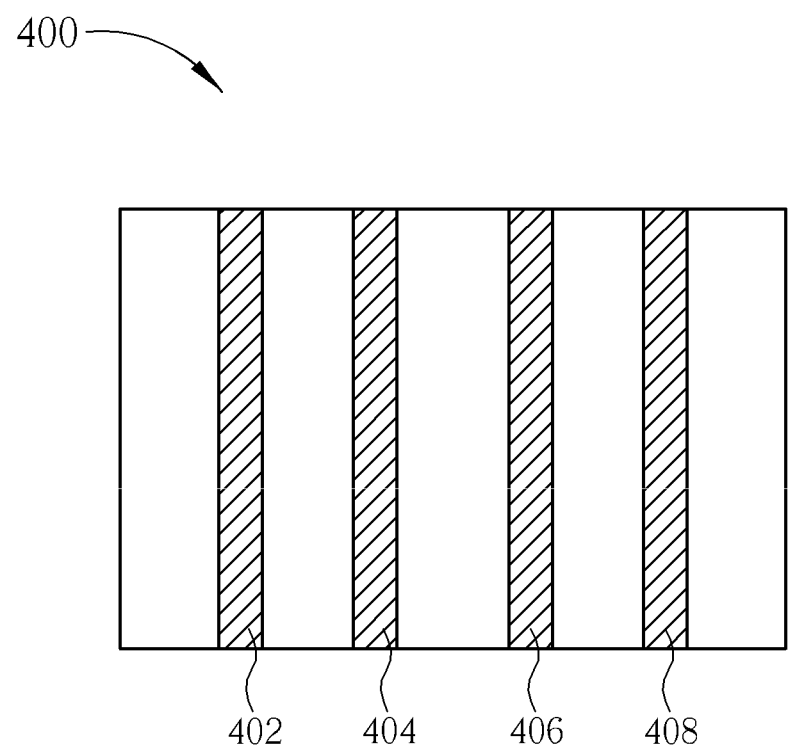
Figure 6B:
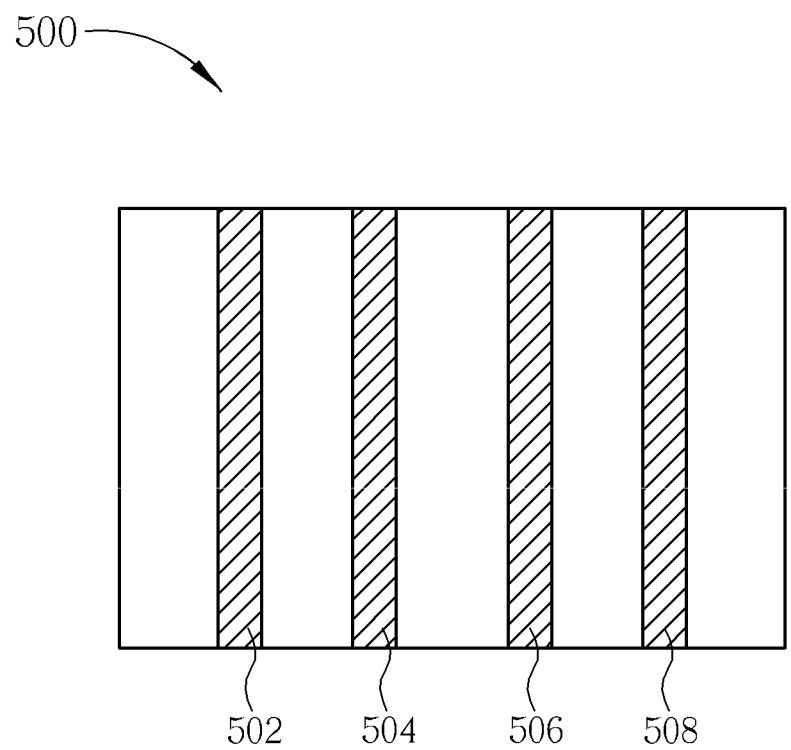
Figure 7:
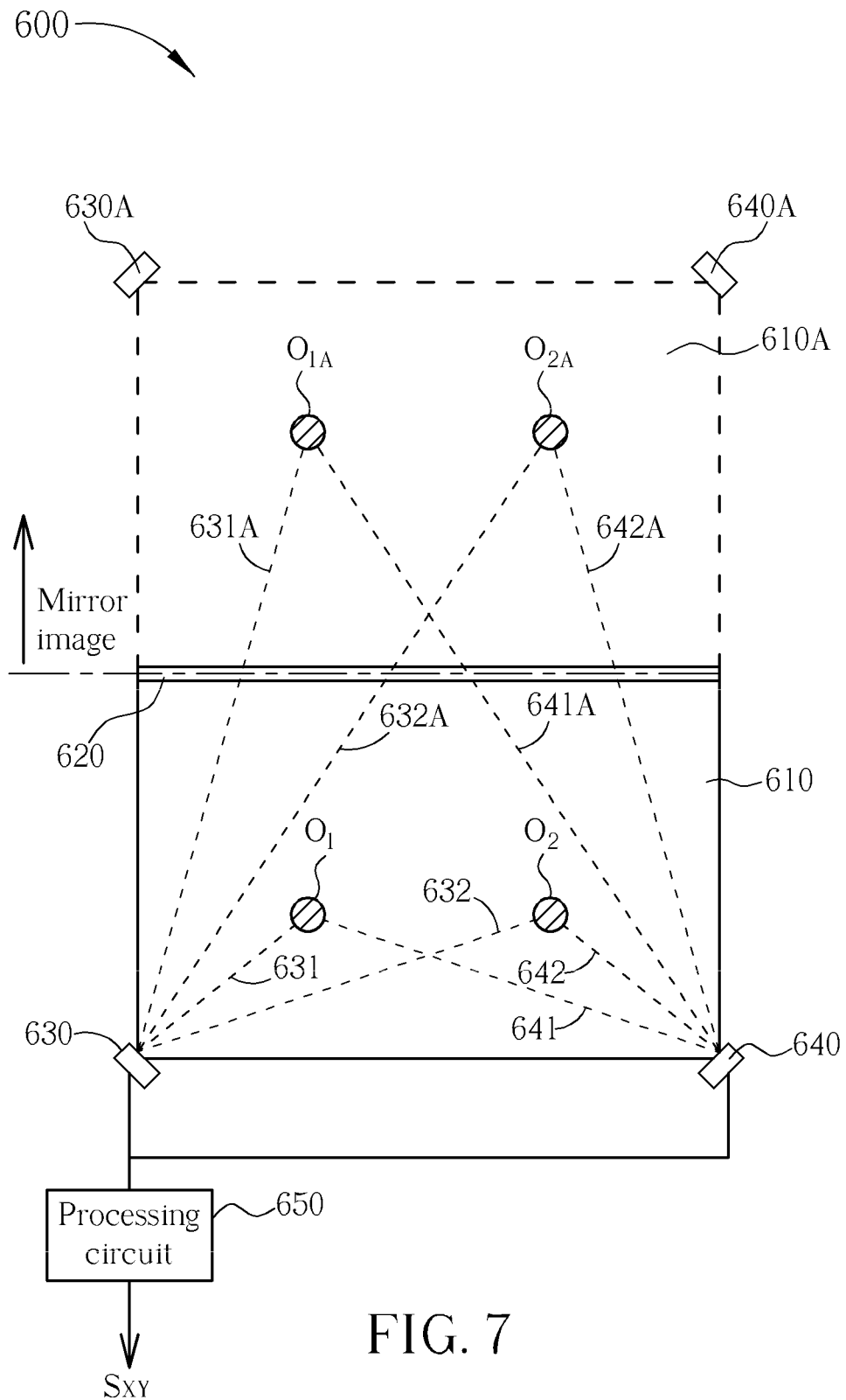
FIG. 7 is a diagram illustrating an optical sensing system according to an embodiment of the present invention.

Please refer to FIG. 7. FIG. 7 is a diagram illustrating an optical sensing system 600 according to an embodiment of the present invention. The optical sensing system 600 includes a sensing area 610, a reflective mirror 620, image-sensing devices 630 and 640, and a processing circuit 650. Sides of the sensing area 610 are also borderlines of the sensing area 610. For ease of explanation, it is assumed that the sensing area 610 has four sides in this embodiment, and the sensing area 610 is rectangular. The sensing area 610 is an area in which a plurality of pointing objects (such as the pointing objects $O_1$ and $O_2$ in FIG. 7) may execute touch operation. The reflective mirror 620 is disposed on one side of the sensing area 610. The reflective mirror 620 is employed to generate the mirror image of the sensing area 610. For example, in FIG. 7, a region 610A represents the mirror image of the sensing area 610. Mirror images 630A and 640A of the image-sensing device 630 and 640, respectively, are also formed. Mirror images $O_{1A}$ and $O_{2A}$ represent the mirror images of the pointing objects $O_1$ and $O_2$, respectively. The operational principle of the optical sensing system 600 is further illustrated in the following description.

Figure 8A:
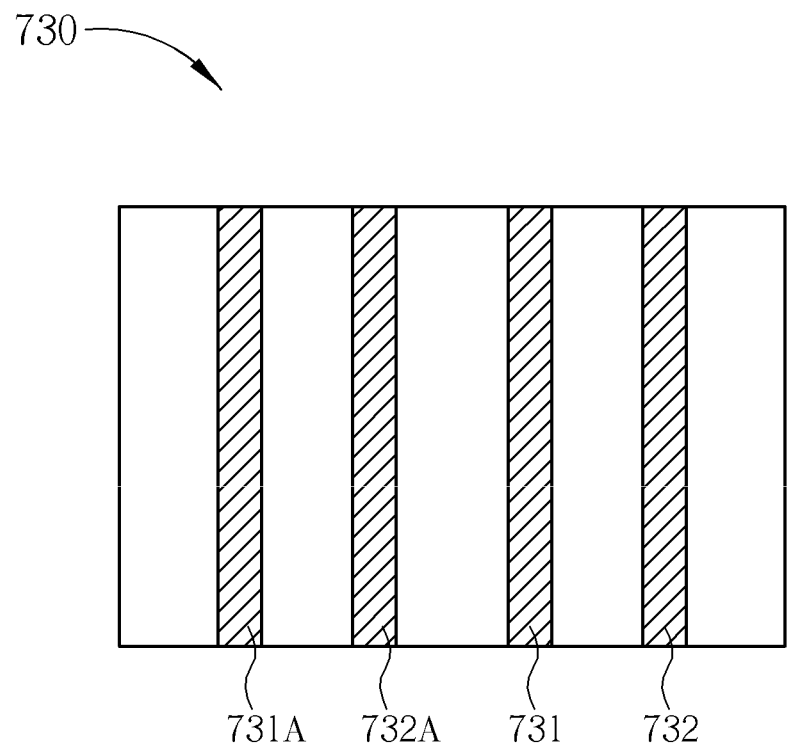
FIG. 8(a) and FIG. 8(b) are diagrams illustrating the images captured by the image-sensing devices of the optical sensing system shown in FIG. 7.
Figure 8B:
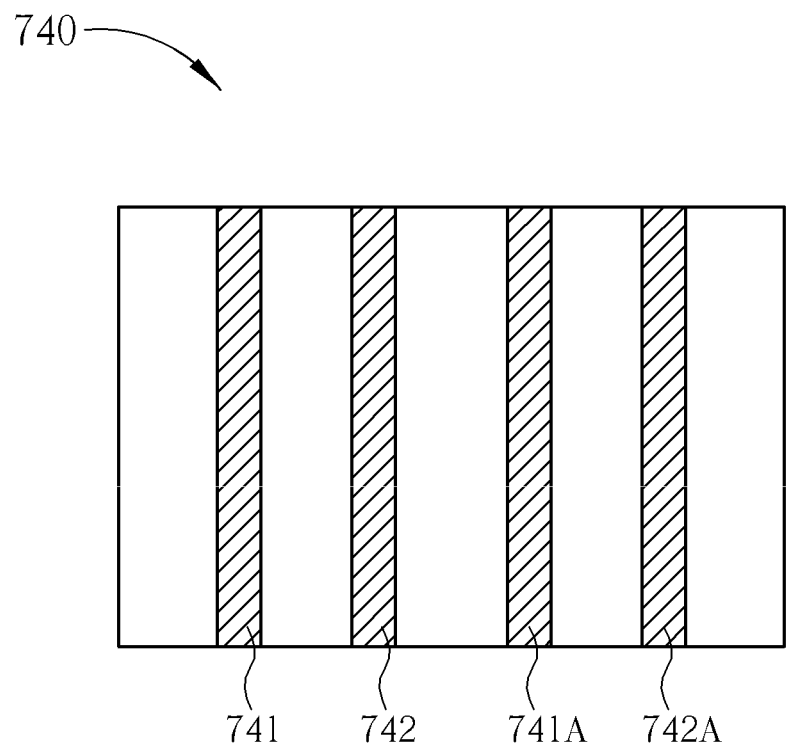

The image-sensing devices 630 and 640 sense the sensing area 610 and the mirror images generated by the reflective mirror 620 to generate an image. As shown in FIG. 7, the image-sensing device 630 senses the mirror image $O_{1A}$ of the pointing object $O_1$ through the optical path 631A, senses the mirror image $O_{2A}$ of the pointing object $O_2$ through the optical path 632A, senses the pointing object $O_1$ through the optical path 631, and senses the pointing object $O_2$ through the optical path 632. The image 730 captured by the image-sensing device 630 is shown in FIG. 8(a). In the image 730, a dark line 731A is generated by the image-sensing device 630 when the image-sensing device 630 senses the mirror image $O_{1A}$ of the pointing object $O_1$ through the optical path 631A. That is, the dark line 731A is a virtual image captured by the image-sensing device 630 when the image-sensing device 630 senses the mirror image $O_{1A}$. A dark line 732A is generated by the image-sensing device 630 when the image-sensing device 630 senses the mirror image $O_{2A}$ of the pointing object $O_2$ through the optical path 632A. That is, the dark line 732A is a virtual image captured by the image-sensing device 630 when the image-sensing device 630 senses the mirror image $O_{2A}$. A dark line 731 is generated by the image-sensing device 630 when the image-sensing device 630 senses the pointing object $O_1$ through the optical path 631. That is, the dark line 731 is a real image captured by the image-sensing device 630 when the image-sensing device 630 senses the pointing object $O_1$. A dark line 732 is generated by the image-sensing device 630 when the image-sensing device 630 senses the pointing object $O_2$ through the optical path 632. That is, the dark line 732 is a real image captured by the image-sensing device 630 when the image-sensing device 630 senses the pointing object $O_2$. In other words, the image-sensing device 630 can capture the real images of the pointing objects $O_1$, $O_2$ (the dark lines 731 and 732) and the virtual images of the pointing object $O_{1A}$, $O_{2A}$ in the reflective mirror 620 (the dark lines 731A and 732A). Similarly, the image-sensing device 640 senses the pointing objects $O_1$ and $O_2$, and mirror images $O_{1A}$ and $O_{2A}$, respectively, through the optical paths 641, 642, 641A, and 642A. The image 740 captured by the image-sensing device 640 is shown in FIG. 8(b). In the image 740, the dark line 741 is a real image captured by the image-sensing device 640 when the image-sensing device 640 senses the pointing object $O_1$. The dark line 742 is a real image captured by the image-sensing device 640 when the image-sensing device 640 senses the pointing object $O_2$. The dark line 741A is a virtual image captured by the image-sensing device 640 when the image-sensing device 640 senses the mirror image $O_{1A}$. The dark line 742A is a virtual image captured by the image-sensing device 640 when the image-sensing device 640 senses the mirror image $O_{2A}$. In other words, the image-sensing device 640 can capture the real images of the pointing objects $O_1$, $O_2$ (the dark lines 741 and 742) and the virtual images of the pointing object $O_{1A}$, $O_{2A}$ in the reflective mirror 620 (the dark lines 741A and 742A).

The processing circuit 650 first determines which dark lines in the images 730 and 740 are real images and which dark lines in the images 730 and 740 are virtual images. The processing circuit 650 then generates a group of real-image candidate coordinates RLOC corresponding to the pointing objects $O_1$, $O_2$ according to the real images captured by the image-sensing devices 630 and 640, and generates a group of virtual-image candidate coordinate VLOC corresponding to the pointing objects $O_1$, $O_2$ according to the virtual images captured by the image-sensing devices 630 and 640. Finally, the processing circuit 650 generates a group of output coordinates $S_{XY}$ corresponding to the pointing objects $O_1$, $O_2$ according to the group of real-image candidate coordinates RLOC and the group of virtual-image candidate coordinate VLOC. The operational principle of the processing circuit 650 is further illustrated in the following description.

Figure 9A:
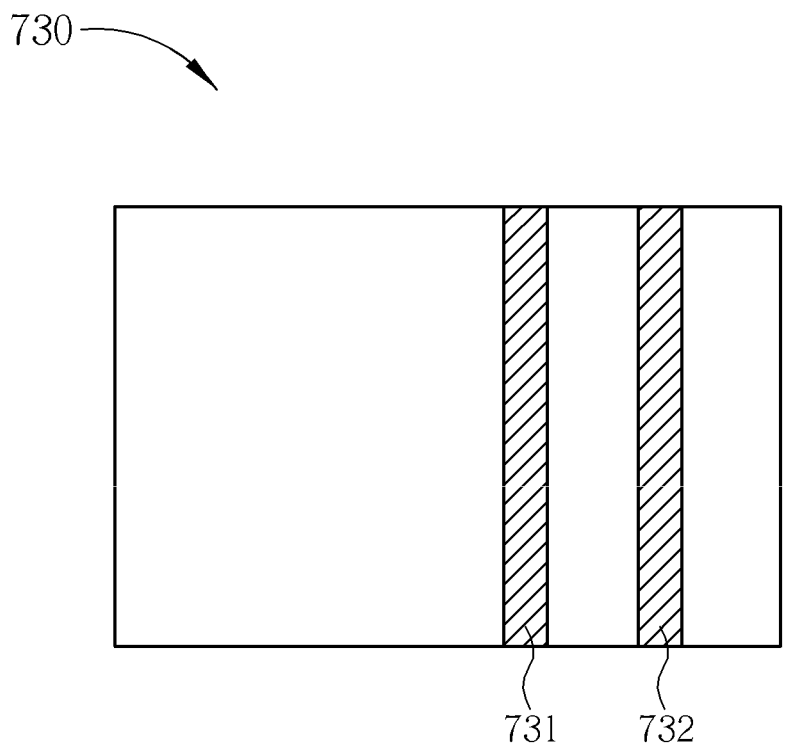
FIG. 9(a) and FIG. 9(b) are diagrams illustrating the processing circuit determining the real images and virtual images from the images captured by the image-sensing devices
Figure 9B:
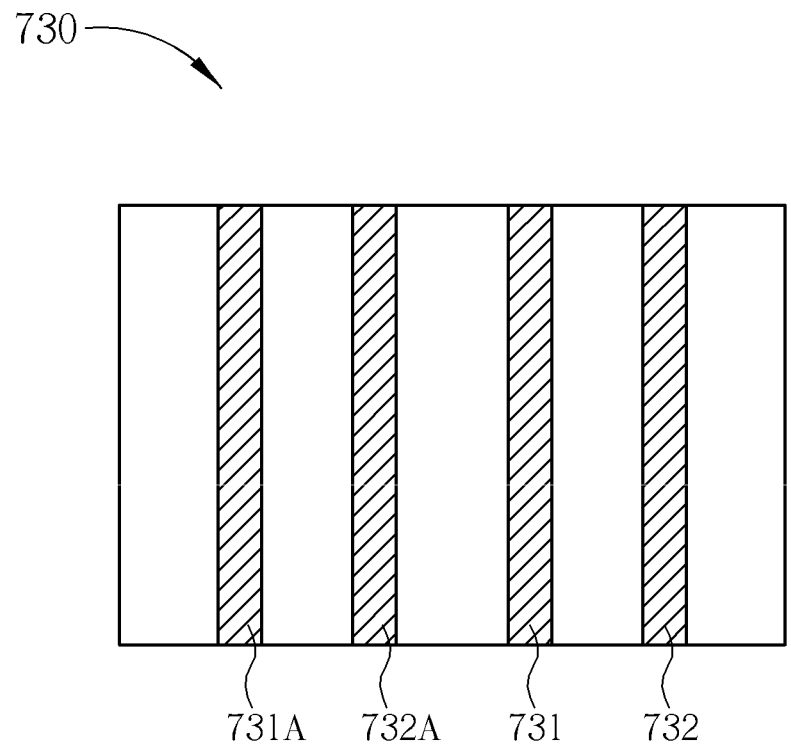
Figure 10:
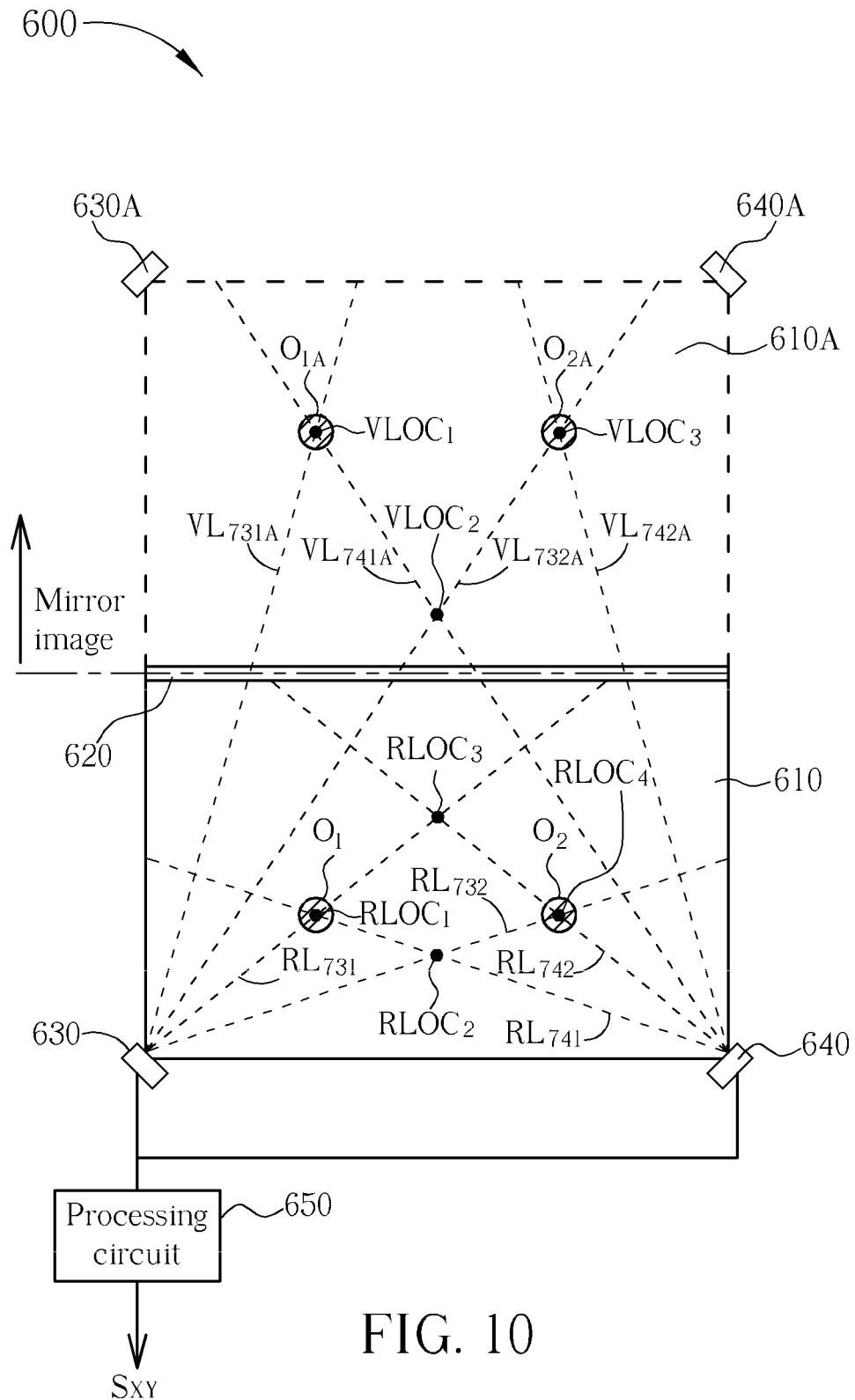
FIG. 10 and FIG. 11 are diagrams illustrating the operational principle of the processing circuit calculating the locations of the pointing objects.

Please refer to FIG. 9(a), FIG. 9(b), and FIG. 10. FIG. 9(a) and FIG. 9(b) are diagrams illustrating the processing circuit 650 determining the real images and virtual images in the images 730 and 740. For the processing circuit 650 capable of determining which dark lines in the images 730 and 740 are real images and which dark lines in the images 730 and 740 are virtual images, when the pointing objects $O_1$ and $O_2$ enter the sensing area 610, the image-sensing devices 630 and 640 captures plural images 730 and plural images 740, respectively. FIG. 9(a) and FIG. 9(b) show examples of the images 730 captured by the image-sensing device 630. When the pointing objects $O_1$ and $O_2$ just enter the sensing area 610, the pointing objects $O_1$ and $O_2$ have not formed images in the reflective mirror 620 yet. Hence, as shown in FIG. 9(a), the image 730 captured by the image-sensing device 630 at the time of initial entry include only the real images of the pointing objects $O_1$, $O_2$, where the real images are dark lines 731 and 732. After a period, the pointing objects $O_1$, $O_2$ form images in the reflective mirror 620. Therefore, as shown in FIG. 9(b), the image 730 captured by the image-sensing device 730 includes the real images of the pointing objects $O_1$, $O_2$ (the dark lines 731 and 732) and the virtual images of the pointing objects $O_{1A}$, $O_{2A}$ in the reflective mirror 620 (the dark lines 731A and 732A). That is, in the images 730 captured by the image-sensing device 630, the real images are formed first, and then the virtual images are formed. As a result, the processing circuit 650 can determine the real images (the dark lines 731 and 732) and the virtual images (the dark lines 731A and 732A) in the images 730 captured by the image-sensing device 630 according to the sequence of the pointing objects $O_1$, $O_2$ forming images in the images 730 captured by the first image-sensing device 630. Similarly, by means of the above-mentioned method, the processing circuit 650 can also determine the real images (the dark lines 741 and 742) and the virtual images (the dark lines 741A and 742A) from the images 740 captured by the image-sensing device 640 according to the sequence of the pointing objects $O_1$, $O_2$ forming images in the images 740 captured by the first image-sensing device 640.

Figure 11:
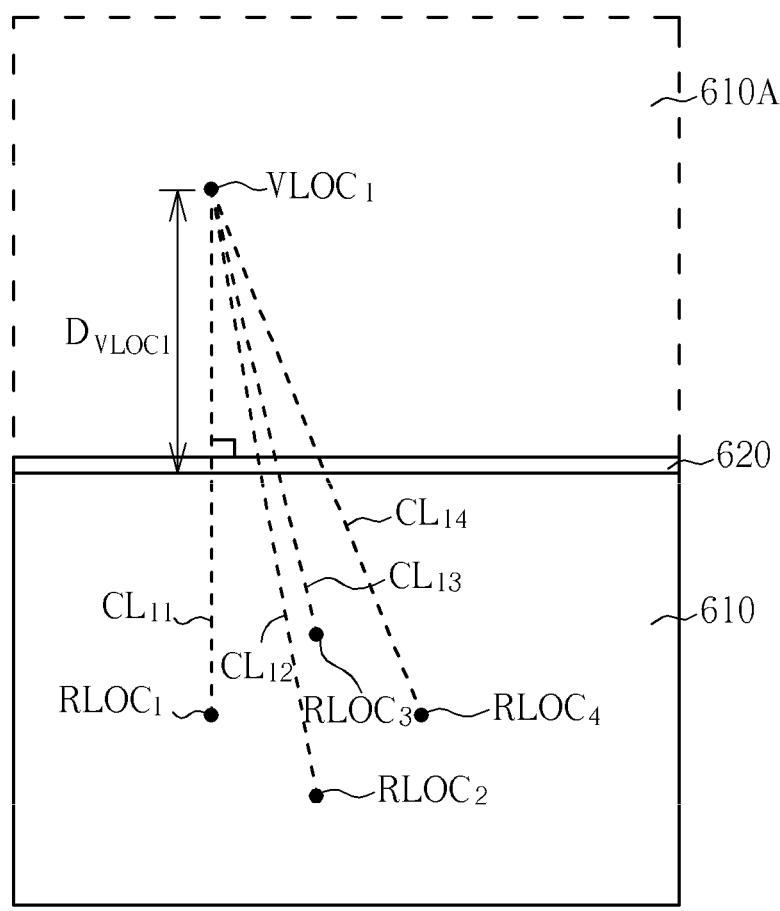

In FIG. 10, the processing circuit 650 generates a first group of real-image blocking lines $RL_{731}$ and $RL_{732}$ according to the locations of the real images (dark lines 731 and 732) in the image 730 and the location of the image-sensing device 630. The processing circuit 650 also generates a second group of real-image blocking lines $RL_{741}$ and $RL_{742}$ according to the locations of the real images (dark lines 741 and 742) in the image 740 and the location of the image-sensing device 640. Since the pointing objects $O_1$, $O_2$ are located on the first group of real-image blocking lines ($RL_{731}$ and $RL_{732}$), and are located on the second group of real-image blocking lines ($RL_{741}$ and $RL_{742}$) as well, the processing circuit 650 can generate real-image candidate coordinates $RLOC_1$, $RLOC_4$ corresponding to the pointing objects $O_1$, $O_2$ according to the crossing points of the first group of real-image blocking lines ($RL_{731}$ and $RL_{732}$) and the second group of real-image blocking lines ($RL_{741}$ and $RL_{742}$). In addition, the processing circuit 650 generates a first group of virtual-image blocking lines $VL_{731A}$ and $VL_{732A}$ according to the locations of the virtual images (the dark lines 731A and 732A) in the image 730 and the location of the image-sensing device 630. The processing circuit 650 also generates a second group of virtual-image blocking lines $VL_{741A}$ and $VL_{742A}$ according to the locations of the virtual images (dark lines 741A and 742A) in the image 740 and the location of the image-sensing device 640. Similarly, since the pointing objects $O_{1A}$, $O_{2A}$ in the reflective mirror 620 are located on the first group of virtual-image blocking lines ($VL_{731A}$ and $VL_{732A}$), and are located on the second group of virtual-image blocking lines ($VL_{741A}$ and $VL_{742A}$) as well, the processing circuit 650 can generate virtual-image candidate coordinates $VLOC_1$, $VLOC_4$ corresponding to the pointing objects $O_{1A}$, $O_{2A}$ in the reflective mirror 620 according to the crossing points of the first group of virtual-image blocking lines ($VL_{731A}$ and $VL_{732A}$) and the second group of virtual-image blocking lines ($VL_{741A}$ and $VL_{742A}$). The locations of the pointing objects $O_1$, $O_2$ in the sensing area 610 are symmetric to the locations of the mirror images $O_{1A}$, $O_{2A}$ with respect to the reflective mirror 620. Thus, the processing circuit 650 can determine the locations of the pointing objects $O_1$, $O_2$ by detecting symmetric relationship between the real-image candidate coordinates $RLOC_1$-$RLOC_4$ and the virtual-image candidate coordinates $VLOC_1$-$VLOC_4$ with respect to the reflective mirror 620. For instance, the processing circuit 650 first detects the symmetric relationship between the virtual-image candidate coordinate $VLOC_1$ and the real-image candidate coordinates $RLOC_1$-$RLOC_4$ with respect to the reflective mirror 620. As shown in FIG. 11, the processing circuit 650 calculates a virtual-image distance $D_{VLOC1}$ between the virtual-image candidate coordinate $VLOC_1$ and the reflective mirror 620, and the processing circuit 650 generates candidate lines $CL_{11}$-$CL_{14}$ by connecting the virtual-image candidate coordinate $VLOC_1$ and the real-image candidate coordinate $RLOC_1$-$RLOC_4$. When the length of the candidate line $CL_{1X}$ is substantially twice the length of the virtual-image distance $D_{VLOC1}$ and the candidate line $CL_{1X}$ is vertical to the reflective mirror 620, the processing circuit 650 determines the real-image candidate coordinate $RLOC_X$ corresponding to the candidate line $CL_{1X}$ is symmetrical to the virtual-image candidate coordinate $VLOC_1$ with respect to the reflective mirror 620. Among the candidate lines $CL_{11}$-$CL_{14}$, since the length of the candidate lines $CL_{11}$ is substantially twice the length of the virtual-image distance $D_{VLOC1}$, and the candidate line $CL_{11}$ is perpendicular to the reflective mirror 620, the processing circuit 650 determines the real-image candidate coordinate $RLOC_1$ is symmetrical to the virtual-image candidate coordinate $VLOC_1$ with respect to the reflective mirror 620. Therefore, the processing circuit 650 determines a pointing object is located at the real-image candidate coordinate $RLOC_1$. In this way, the processing circuit 650 generates an output coordinate $S_{XY1}$ corresponding to a pointing object ($O_1$) in response to the real-image candidate coordinate $RLOC_1$, and records the output coordinate $S_{XY1}$ into the group of output coordinates $S_{XY}$. The processing circuit 650 then detects the symmetric relationship between the virtual-image candidate coordinate $VLOC_2$ and the real-image candidate coordinates $RLOC_1$-$RLOC_4$ with respect to the reflective mirror 620. Since the virtual-image candidate coordinate $VLOC_2$ is not symmetrical to any of the real-image candidate coordinates $RLOC_1$-$RLOC_4$ with respect to the reflective mirror 620, the processing circuit 650 determines no mirror image of the pointing object is located at the virtual-image candidate coordinate $VLOC_2$. Finally, the processing circuit 650 detects the symmetric relationship between the virtual-image candidate coordinate $VLOC_3$ and the real-image candidate coordinates $RLOC_1$-$RLOC_4$ with respect to the reflective mirror 620. The virtual-image candidate coordinate $VLOC_3$ is symmetrical to the real-image candidate coordinate $RLOC_4$ with respect to the reflective mirror 620, so the processing circuit 650 determines a pointing object is located at the real-image candidate coordinate $RLOC_4$. In this way, the processing circuit 650 generates an output coordinate $S_{XY2}$ corresponding to a pointing object ($O_2$) in response to the real-image candidate coordinate $RLOC_4$, and records the output coordinate $S_{XY2}$ into the group of output coordinates $S_{XY}$. Consequently, it can be seen from the above-mentioned description that the processing circuit 650 can generate the group of output coordinates $S_{XY}$ corresponding to the pointing object $O_1$, $O_2$ according to the real-image candidate coordinates $RLOC_1$-$RLOC_4$ and the virtual-image candidate coordinates $VLOC_1$-$VLOC_3$.

Figure 12:
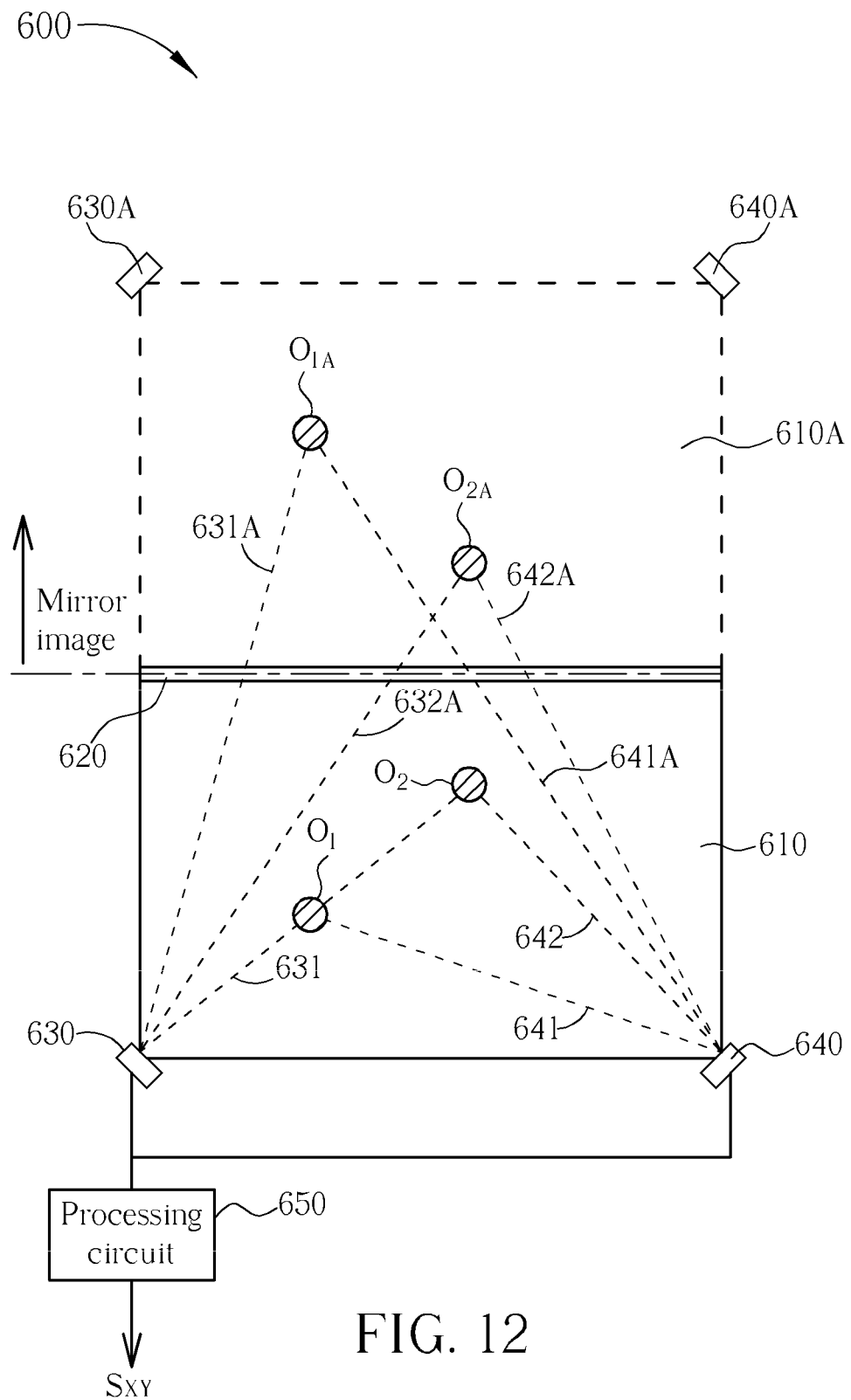
FIG. 12 is a diagram illustrating the image captured by the image-sensing device including only part of real images of the pointing objects.

In addition, please note that in the above-mentioned description both of the image-sensing devices 630 and 640 can capture images including all of the real images of the pointing objects $O_1$, $O_2$ and all of the virtual images of the pointing objects $O_{1A}$, $O_{2A}$ in the reflective mirror 620. However, when the pointing objects $O_1$ and $O_2$ are located on the same optical path with respect to the image-sensing device 630, the image-sensing device 630 can only capture part of real images of the pointing objects $O_1$, $O_2$, as shown in FIG. 12. In other words, the image captured by the image-sensing device 630 may include only part of the real images of the pointing objects $O_1$, $O_2$ and part of the virtual images of the pointing objects $O_{1A}$, $O_{2A}$ in the reflective mirror 620 because of the variance of the locations of the pointing objects $O_1$, $O_2$. Similarly, the image captured by the image-sensing device 640 may include only part of the real images of the pointing objects $O_1$, $O_2$ and part of the virtual images of the pointing objects $O_{1A}$, $O_{2A}$ in the reflective mirror 620 because of the variance of the locations of the pointing objects $O_1$, $O_2$. However, regardless of whether the images captured by the image-sensing device 630 and 640 include all of the real images of the pointing objects $O_1$, $O_2$ and all of the virtual images of the pointing objects $O_1$, $O_2$ or not, the processing circuit 650 can correctly calculate the output coordinates $S_{XY}$ corresponding to the pointing objects $O_1$, $O_2$ by means of the above-mentioned method.

In addition, in the above description, the processing circuit 650 determines the real images and the virtual images in the images captured by the image-sensing devices 630 and 640 according to the sequence of the pointing objects $O_1$, $O_2$ forming images. The present invention further provides another method by which the processing circuit 650 determines the real images and the virtual images from the images captured by the image-sensing devices 630 and 640. The related operational principle is illustrated in the following description.

Figure 13:
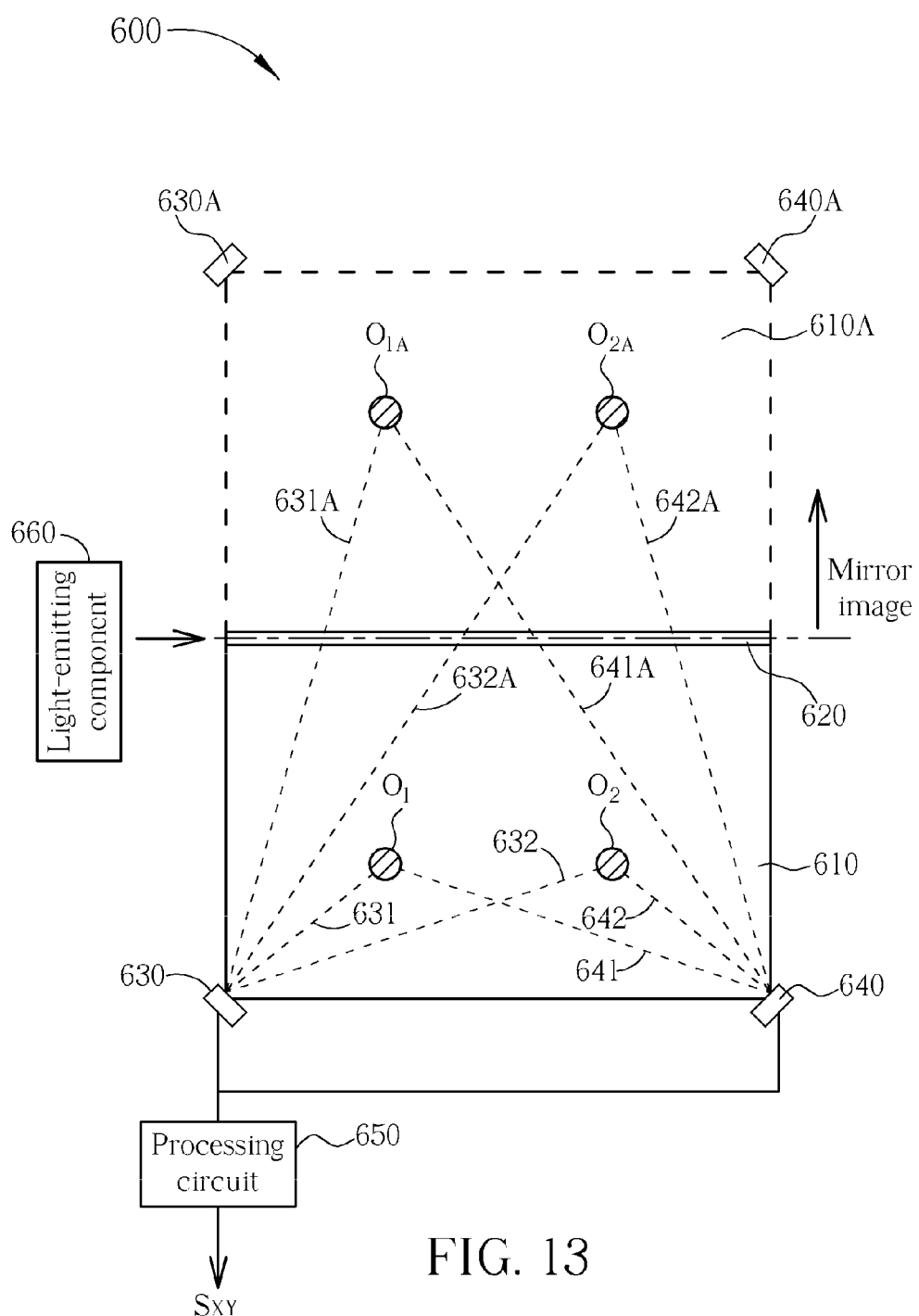
FIG. 13 is a diagram illustrating that the reflective mirror of the optical sensing system can be realized with a mirror-surface light-guiding component.
Figure 14:
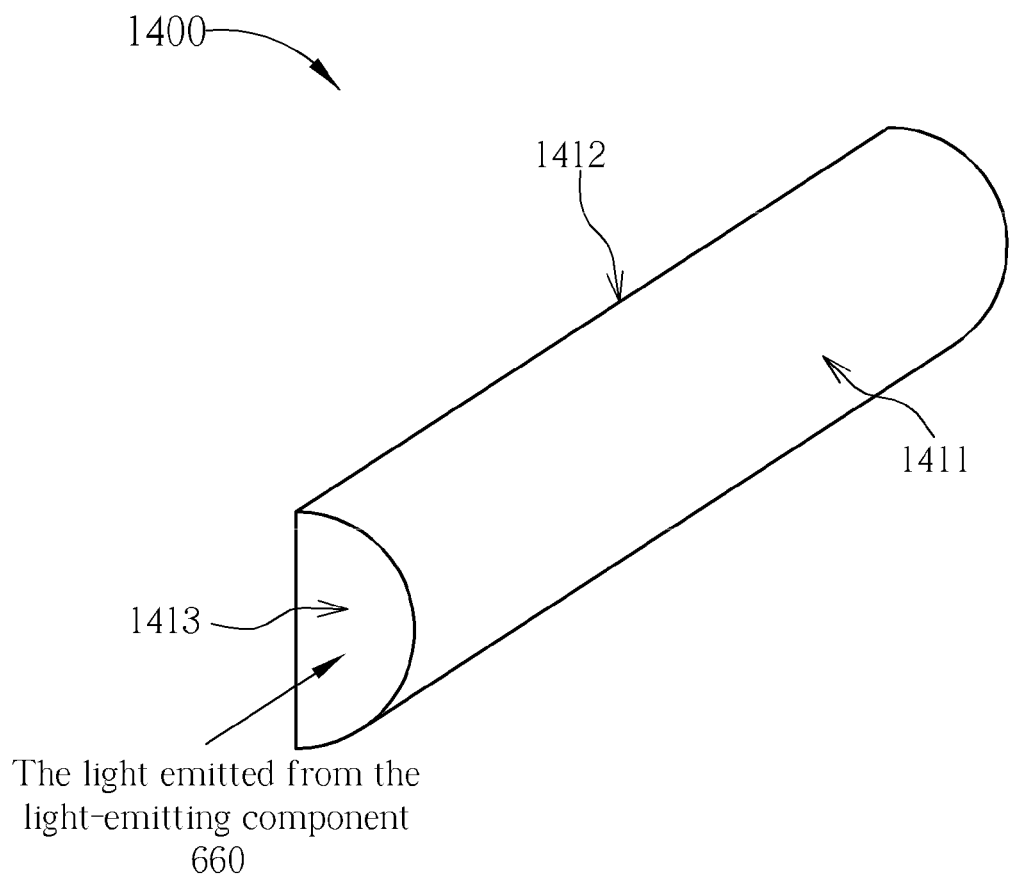
FIG. 14, FIG. 15, and FIG. 16 are diagrams respectively illustrating mirror-surface light-guiding component according to three embodiments of the present invention.
Figure 15:
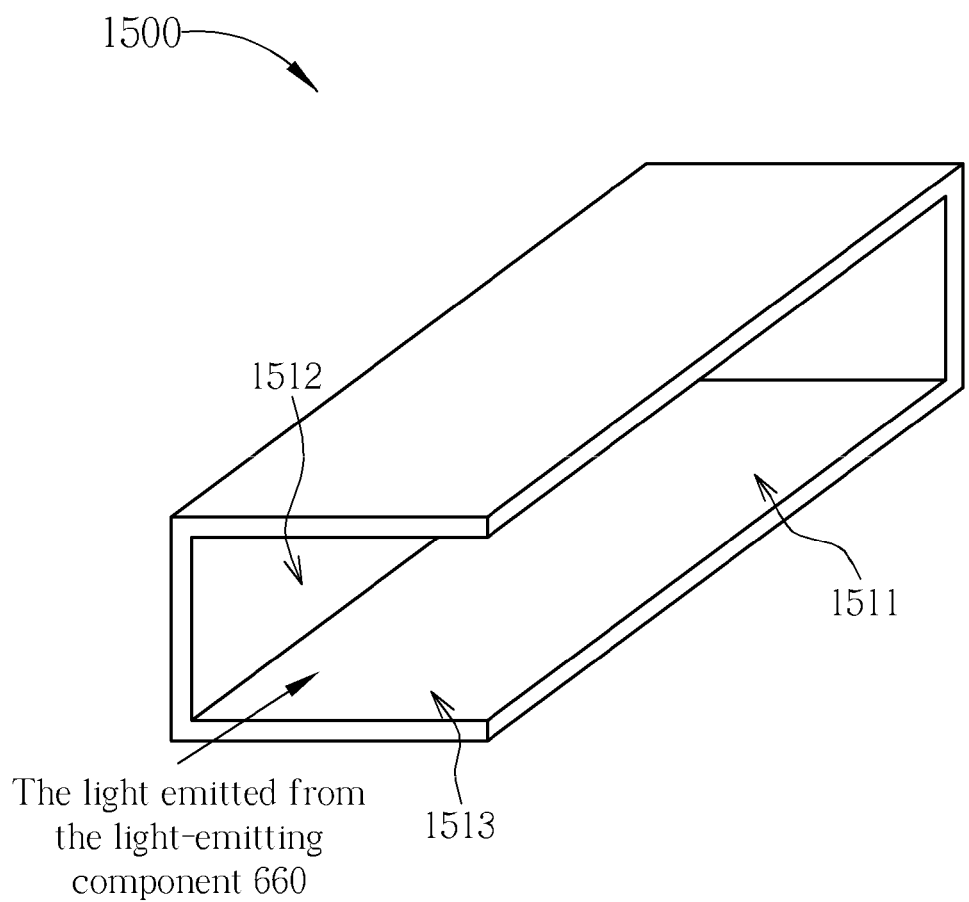
Figure 16:
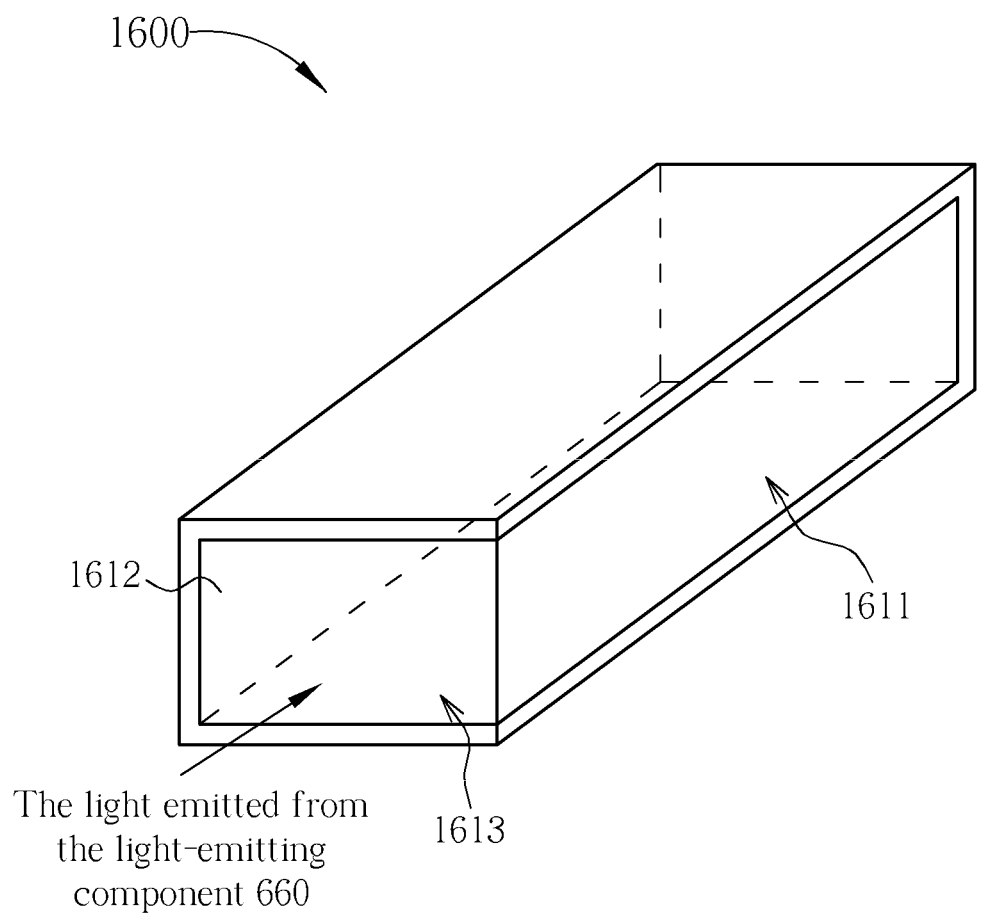

Please refer to FIG. 13, FIG. 14, FIG. 15 and FIG. 16. In FIG. 13, for the processing circuit 650 to determine the real images and the virtual images in the images captured by the image-sensing devices 630 and 640, the reflective mirror 620 of the optical sensing system 600 is realized with a mirror-surface light-guiding component. FIG. 14, FIG. 15, and FIG. 16 are diagrams illustrating three mirror-surface light-guiding components of the present invention. In FIG. 14, the mirror-surface light-guiding component 1400 includes a light-emitting surface 1411, a mirror surface 1412 facing the light-emitting surface 1411, and a light-receiving surface 1413. The mirror surface 1412, for example, can be realized by coating a mirror-surface reflective material on a surface. The light-receiving surface 1413 is utilized for receiving light. When the light-receiving surface 1413 receives light, the mirror surface 1412 reflects the light so that the light is emitted from the light-emitting surface 1411. When the light-receiving surface 1413 does not receive light, the mirror surface 1412 functions as the reflective mirror 620 so as to generate the mirror image of the sensing area 610. In the embodiment shown in FIG. 14, the mirror-surface light-guiding component 1400 is semi-cylindrical. The light-emitting surface 1411 is a curved surface coupled to the mirror surface 1412. The mirror surface 1412 is a planar surface. In addition, the mirror-surface light-guiding component 1400 is not limited to being semi-cylindrical. For instance, the mirror-surface light-guiding component 1400 can be solid or hollow with another proper shape, and the mirror surface 1412 can be a curved surface according to the user's requirement. FIG. 15 is a diagram illustrating a mirror-surface light-guiding component 1500 according to another embodiment of the present invention. The mirror-surface light-guiding component 1500 includes a light-emitting surface 1511, a mirror surface 1512 facing the light-emitting surface 1511, and a light-receiving surface 1513. The function of the mirror-surface light-guiding component 1500 is similar to that of the mirror-surface light-guiding component 1400. The mirror-surface light-guiding component 1500 has a shape different from that of the mirror-surface light-guiding component 1400, and the mirror-surface light-guiding component 1500 is hollow. FIG. 16 is a diagram illustrating a mirror-surface light-guiding component 1600 according to another embodiment of the present invention. The mirror-surface light-guiding component 1600 includes a light-emitting surface 1611, a mirror surface 1612 facing the light-emitting surface 1611, and a light-receiving surface 1613. The function of the mirror-surface light-guiding component 1600 is similar to that of the mirror-surface light-guiding component 1500, differing in that the light-receiving surface 1613 and the light-emitting surface 1611 are two surfaces of a transparent layer.

For ease of explanation, in FIG. 13, the reflective mirror 620 of the optical sensing system 600 is realized with the mirror-surface light-guiding component 1600. The optical sensing system 600 further includes a light-emitting component 660. The light-emitting component 660 emits light to the light-receiving surface 1613 of the mirror-surface light-guiding component 1600 in a light-emitting period, and the light-emitting component 660 does not emit light to the light-receiving surface 1613 of the mirror-surface light-guiding component 1600 in a non-light-emitting period. Furthermore, in the light-emitting period, the light-receiving surface 1613 of the mirror-surface light-guiding component 1600 receives light. Meanwhile, the mirror surface 1412 reflects light, so that the light-emitting surface 1611 emits light to the sensing area 610. In this way, instead of sensing the mirror image generated by the mirror surface 1612, the image-sensing device 630 can only sense the light emitted by the light-emitting surface 1611. Therefore, as shown in FIG. 9(*a*), the image 730 captured by the image-sensing device 630 in the light-emitting period only includes the real images of the pointing objects $O_1$, $O_2$ (the dark lines 731 and 732). In the non-light-emitting period, the light-receiving surface 1613 does not receive light. Meanwhile, the image-sensing device 630 can sense the mirror image generated by the mirror surface 1612. Thus, as shown in FIG. 9(*b*), the image 730 captured by the image-sensing device 630 includes the real images of the pointing objects $O_1$, $O_2$ (the dark lines 731 and 732) and the virtual images of the pointing objects $O_{1A}$, $O_{2A}$ in the mirror surface 1612 (the dark lines 731A and 732A). In this way, the processing circuit 650 compares the image 730 captured in the light-emitting period with the image 730 captured in the non-light-emitting period, so as to determine the dark lines 731 and 732 in the image 730 captured in the non-light-emitting period are real images, and the dark lines 731A and 732A in the image 730 captured in the non-light-emitting period are virtual images. Similarly, the processing circuit 650 compares the image 740 captured by the image-sensing device 640 in the light-emitting period with the image 740 captured by the image-sensing device 640 in the non-light-emitting period, so as to determine the real images of the pointing object $O_1$, $O_2$ (the dark lines 741 and 742) and the virtual images of the pointing object $O_{1A}$, $O_{2A}$ in the mirror surface 1612 (the dark lines 741A and 742A) from the image 740 captured in the non-light-emitting period.

In conclusion, in the present embodiment, when a plurality of pointing objects is located in the sensing area 610, the image-sensing device 630 captures a group of real images corresponding to all or part of the pointing objects, and a group of virtual images corresponding to all or part of the pointing objects in the reflective mirror, and the image-sensing device 640 also captures a group of real images corresponding to all or part of the pointing objects, and a group of virtual images corresponding to all or part of the pointing objects in the reflective mirror. The processing circuit 650 first determines which dark lines in the images captured by the image-sensing devices 630 and 640 are real images and which dark lines in the images captured by the image-sensing devices 630 and 640 are virtual images, and then generates a group of real-image candidate coordinates RLOC corresponding to the plurality of pointing objects according to the real images captured by the image-sensing devices 630 and 640, and generates a group of virtual-image candidate coordinates VLOC corresponding to the plurality of pointing objects according to the virtual images captured by the image-sensing devices 630 and 640. Finally, the processing circuit 650 calculates the locations of the plurality of pointing objects according to the group of real-image candidate coordinates RLOC and the group of virtual-image candidate coordinates VLOC, so as to generate a group of output coordinates $S_{XY}$. As a result, compared with the prior art, in the present embodiment, even if a plurality of pointing objects is located in the sensing area 610, the processing circuit 650 can still correctly calculate the locations of the plurality of pointing objects. That is, multi-touch operation can be performed by the optical sensing system provided by the present invention.

In addition to the above-mentioned method of the processing circuit 650 calculating the locations of the pointing objects, the present invention further provides a second embodiment in the following description.

Figure 17:
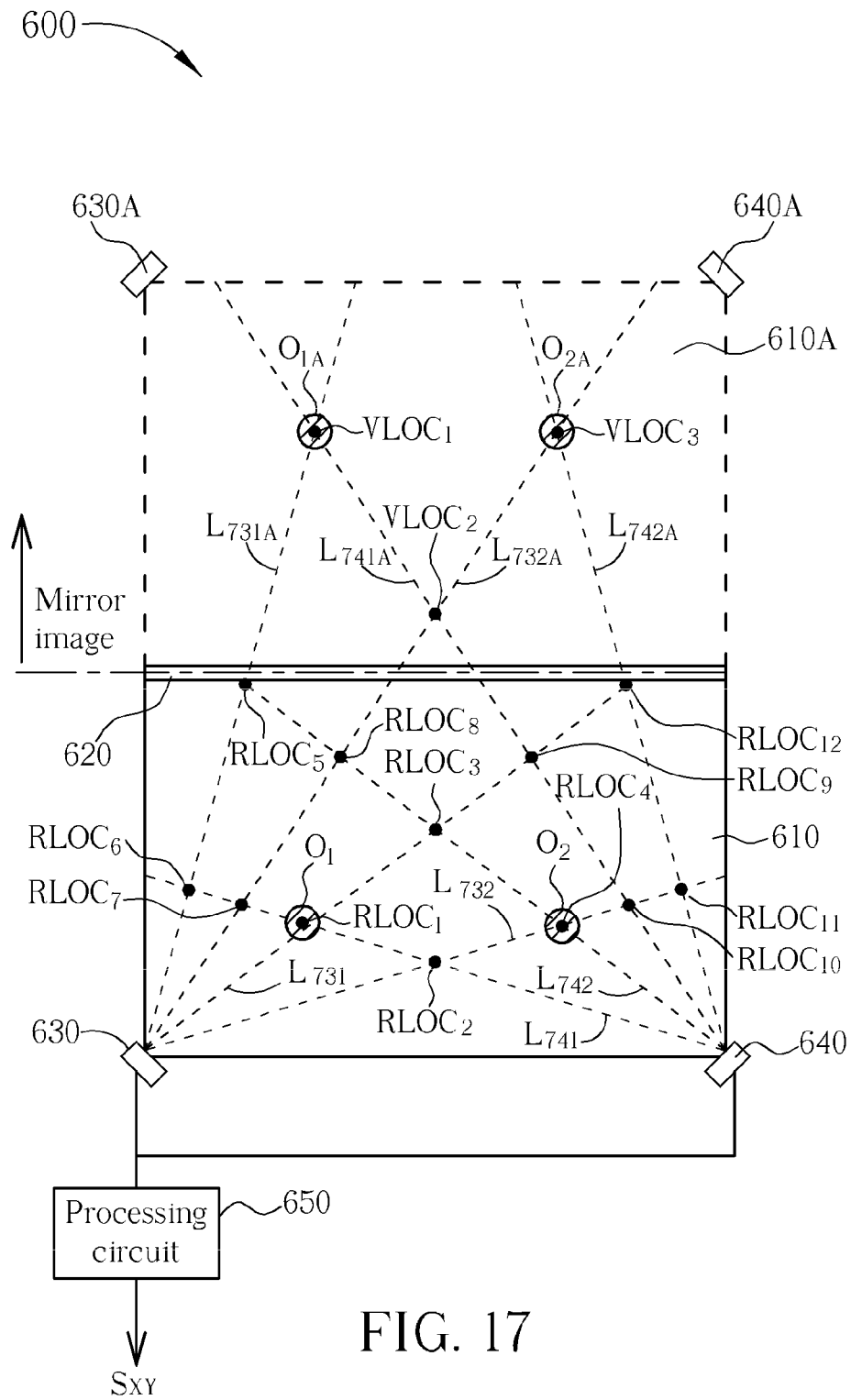
FIG. 17 is a diagram illustrating a method of the processing circuit calculating the locations of the pointing objects according to a second embodiment of the present invention.

Provided that the image-sensing device 630 captures an image 730 as shown in FIG. 8(a) and the image-sensing device 640 captures an image 740 as shown in FIG. 8(b), the processing circuit 650, as shown in FIG. 17, can generate a first group of blocking lines ($L_{731}$, $L_{732}$, $L_{731A}$ and $L_{732A}$) according to the locations of the dark lines in the image 730 and the location of the image-sensing device 630, and a second group of blocking lines ($L_{741}$, $L_{742}$, $L_{741A}$ and $L_{742A}$) according to the locations of the dark lines in the image 740 and the location of the image-sensing device 640. The processing circuit 650 generates a group of candidate coordinates LOC (including $RLOC_1$-$RLOC_{12}$ and $VLOC_1$-$VLOC_3$) corresponding to the pointing objects according to the crossing points of the first group of blocking lines ($L_{731}$, $L_{732}$, $L_{731A}$, and $L_{732A}$) and the second group of blocking lines ($L_{741}$, $L_{742}$, $L_{741A}$, and $L_{742A}$). The processing circuit 650 further generates a group of real-image candidate coordinates and a group of virtual-image candidate coordinates according to the location of the reflective mirror 620 and the candidate coordinates LOC. More particularly, the processing circuit 650 divides the candidate coordinates into a group of real-image candidate coordinates ($RLOC_1$-$RLOC_{12}$) in the sensing area 610 and a group of virtual-image candidate coordinates ($VLOC_1$-$VLOC_3$) in the mirror image generated by the reflective mirror 620 according to the location of the reflective mirror 620. For example, in FIG. 17, the candidate coordinates above the reflective mirror 620 belong to the group of real-image candidate coordinates, and the candidate coordinates below the reflective mirror 620 belong to the group of virtual-image candidate coordinates. The real-image candidate coordinates ($RLOC_1$-$RLOC_{12}$) are the possible locations of the pointing objects $O_1$-$O_2$, and the virtual-image candidate coordinates ($VLOC_1$-$VLOC_3$) are the possible locations of the pointing objects $O_{1A}$, $O_{2A}$ in the reflective mirror 620. Since the locations of the pointing objects $O_1$, $O_2$ in the sensing area 610 are symmetrical to the locations of the pointing objects $O_{1A}$, $O_{2A}$ in the reflective mirror 620 with respect to the reflective mirror 620, the processing circuit 650 can determine the locations of the pointing objects $O_1$, $O_2$ by detecting symmetric relationship between the real-image candidate coordinates $RLOC_1$-$RLOC_{12}$ and the virtual-image candidate coordinates $VLOC_1$-$VLOC_3$ with respect to the reflective mirror 620. For example, the processing circuit 650 sequentially detects the symmetric relationship between the virtual-image candidate coordinates $VLOC_1$-$VLOC_3$ and the real-image candidate coordinates $RLOC_1$-$RLOC_{12}$ with respect to the reflective mirror 620. Since the virtual-image candidate coordinate $VLOC_1$ is symmetrical to the real-image candidate coordinate $RLOC_1$ with respect to the reflective mirror 620, the processing circuit 650 determines a pointing object is located at the real-image candidate coordinate $RLOC_1$. In this way, the processing circuit 650 generates an output coordinate $S_{XY1}$ corresponding to the pointing object ($O_1$) according to the real-image candidate coordinate $RLOC_1$, and records the output coordinate $S_{XY1}$ into the group of output coordinates $S_{XY}$. The virtual-image candidate coordinate $VLOC_2$ is not symmetrical to any of the real-image candidate coordinates $RLOC_1$, $RLOC_{12}$ with respect to the reflective mirror 620. As a result, the processing circuit 650 determines no mirror image of pointing object is located at the virtual-image candidate coordinate $VLOC_2$. The virtual-image candidate coordinate $VLOC_3$ is symmetrical to the real-image candidate coordinate $RLOC_4$ with respect to the reflective mirror 620. Hence, the processing circuit 650 determines a pointing object is located at the real-image candidate coordinate $RLOC_4$. In this way, the processing circuit 650 generates an output coordinate $S_{XY2}$ corresponding to the pointing object ($O_2$) according to the real-image candidate coordinate $RLOC_4$, and records the output coordinate $S_{XY2}$ into the group of output coordinates $S_{XY}$. Consequently, it can be seen according to the above description that even if the processing circuit 650 does not determine which dark lines in the images 730 and 740 are real images and which dark lines in the images 730 and 740 are virtual images, the processing circuit 650 can still calculate the locations of the pointing objects $O_1$, $O_2$ and generate the output coordinates $S_{XY}$ corresponding to the pointing objects $O_1$, $O_2$ according to the location of the reflective mirror 620 and the candidate coordinates LOC.

Figure 18:
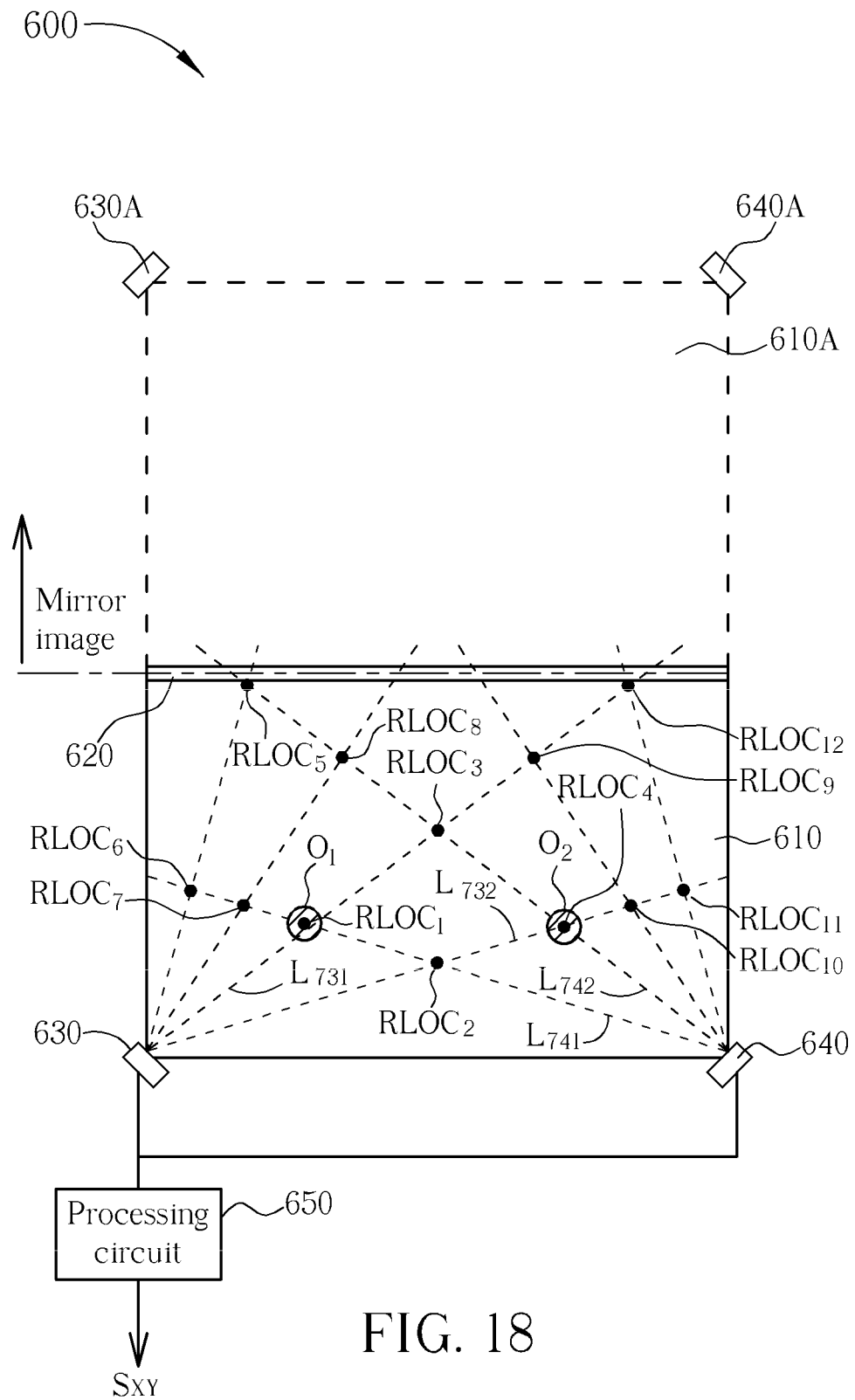
FIG. 18 and FIG. 19 are diagrams illustrating a method of the processing circuit calculating the locations of the pointing objects according to a third embodiment of the present invention.
Figure 19:
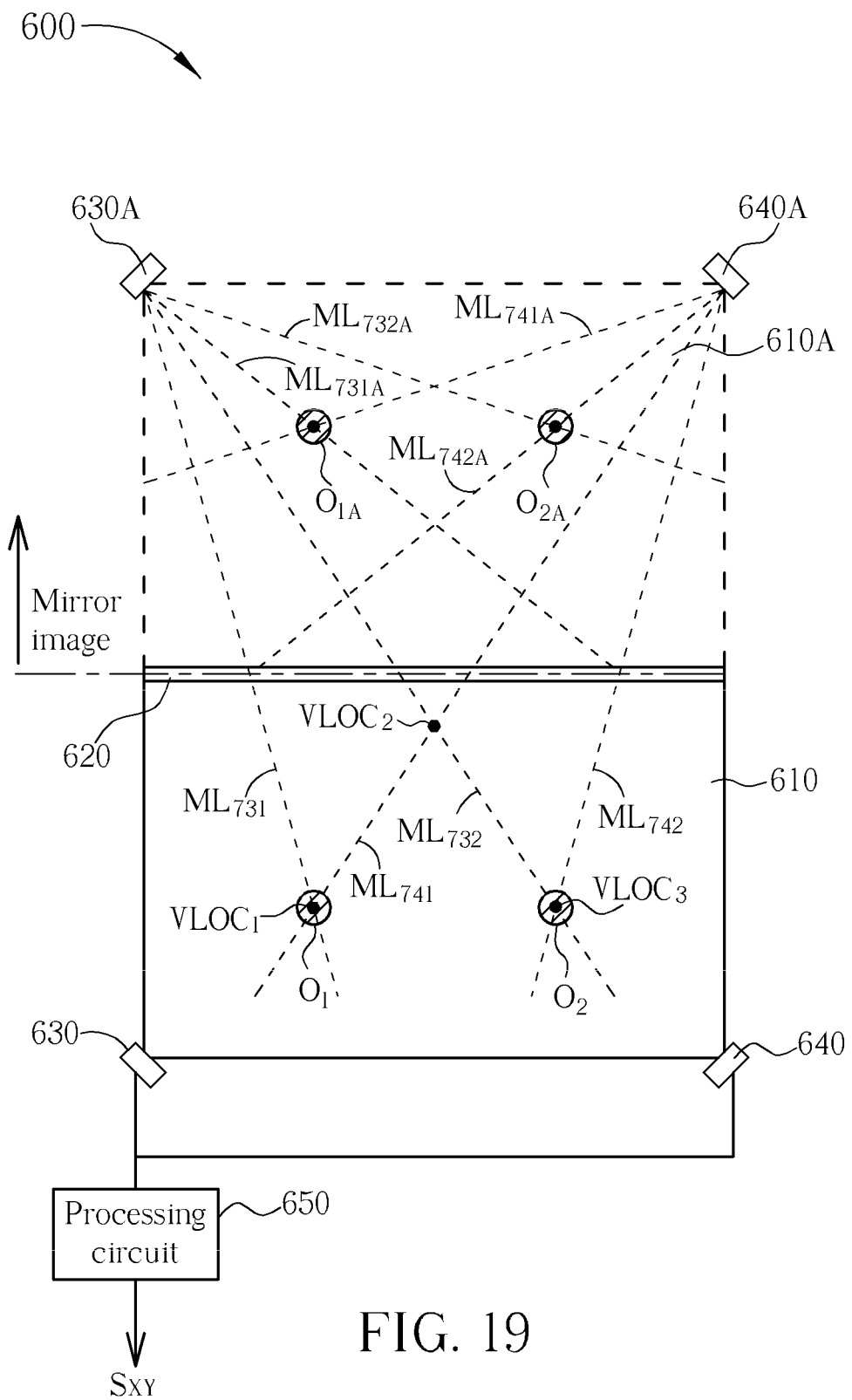

According to the basic spirit of the second embodiment of the present invention, the present invention further provides a third embodiment for the processing circuit 650 calculating the locations of the pointing objects. Please refer to FIG. 18 and FIG. 16. In FIG. 18, the processing circuit 650 generates a first group of blocking lines ($L_{731}$, $L_{732}$, $L_{731A}$, and $L_{732A}$) according to the image 730 captured by the image-sensing device 630 and the location of the image-sensing device 630, and the processing circuit 650 generates a second group of blocking lines ($L_{741}$, $L_{742}$, $L_{741A}$, and $L_{742A}$) according to the image 740 captured by the image-sensing device 640 and the location of the image-sensing device 640. The processing circuit 650 generates the real-image candidate coordinates $RLOC_1$-$RLOC_{12}$ which are located in the sensing area 610 and corresponding to the pointing objects $O_1$, $O_2$ according to the crossing points of the first group of blocking lines ($L_{731}$, $L_{732}$, $L_{731A}$, and $L_{732A}$) and the second group of blocking lines ($L_{741}$, $L_{742}$, $L_{741A}$, and $L_{742A}$). The real-image candidate coordinates $RLOC_1$-$RLOC_{12}$ are the possible locations of the pointing objects $O_1$, $O_2$. In FIG. 19, the processing circuit 650 generates a first group of mirror-image lines ($ML_{731}$, $ML_{732}$, $ML_{731A}$, and $ML_{732A}$) symmetric to the first group of blocking lines ($L_{731}$, $L_{732}$, $L_{731A}$, and $L_{732A}$) with respect to the reflective mirror 620 according to the location of the image-sensing device 630A in the reflective mirror 620. It can be seen in FIG. 18 and FIG. 19 that the mirror-image line $ML_{731}$ is symmetrical to the blocking line $L_{731A}$, the mirror-image line $ML_{732}$ is symmetrical to the blocking line $L_{732A}$, the mirror-image line $ML_{731A}$ is symmetrical to the blocking line $L_{731}$, and the mirror-image line $ML_{732A}$ is symmetrical to the blocking line $L_{732}$. Similarly, the processing circuit 650 generates a second group of mirror-image lines ($ML_{741}$, $ML_{742}$, $ML_{741A}$, and $ML_{742A}$) symmetrical to the second group of blocking lines ($L_{741}$, $L_{742}$, $L_{741A}$, and $L_{742A}$) with respect to the reflective mirror 620 according to the location of the image-sensing device 640A in the reflective mirror 620. It can be seen in FIG. 18 and FIG. 19 that the mirror-image line $ML_{741}$ is symmetrical to the blocking line $L_{741A}$, the mirror-image line $ML_{742}$ is symmetrical to the blocking line $L_{742A}$, the mirror-image line $ML_{741A}$ is symmetrical to the blocking line $L_{741}$, and the mirror-image line $ML_{742A}$ is symmetrical to the blocking line $L_{742}$. The processing circuit 650 generates a group of virtual-image candidate coordinates $VLOC_1$-$VLOC_3$ in the sensing area 610 according to the first group of mirror-image lines ($ML_{731}$, $ML_{732}$, $ML_{731A}$, and $ML_{732A}$) and the second group of mirror-image lines ($ML_{741}$, $ML_{742}$, $ML_{741A}$, and $ML_{742A}$). It can be seen in FIG. 17 and FIG. 19 the virtual-image candidate coordinates $VLOC_1$-$VLOC_3$ generated by the processing circuit 650 in FIG. 19 are symmetrical to the virtual-image candidate coordinates $VLOC_1$-$VLOC_3$ generated by the processing circuit 650 in FIG. 17 with respect to the reflective mirror 620. Since the virtual-image candidate coordinates $VLOC_1$-$VLOC_3$ in FIG. 17 are the possible locations of the pointing objects $O_{1A}$, $O_{2A}$ in the reflective mirror 620, the virtual-image candidate coordinates $VLOC_1$-$VLOC_3$ in FIG. 19 are the possible locations of the pointing objects $O_1$, $O_2$ in the sensing area 610. Hence, the processing circuit 650 compares the real-image candidate coordinates $RLOC_1$-$RLOC_{12}$ in FIG. 18 with the virtual-image candidate coordinates $VLOC_1$-$VLOC_3$ in FIG. 19 to generate the output coordinates $S_{XY}$ corresponding to the pointing objects $O_1$, $O_2$. For example, the processing circuit 650 calculates the candidate distances $D_{1\_1}$-$D_{1\_12}$ between the virtual-image candidate coordinate $VLOC_1$ and the real-image candidate coordinates $RLOC_{1\_1}$-$RLOC_{1\_12}$. When a candidate distance $D_{1\_X}$ is shorter than an error distance $D_{ERROR}$, the processing circuit 650 determines that the virtual-image candidate coordinate $VLOC_1$ and the real-image candidate coordinate $RLOC_X$ represent the same location, and a pointing object is located at the real-image candidate coordinate $RLOC_X$ (or the virtual-image candidate coordinate $VLOC_1$). Hence, the processing circuit 650 generates an output coordinate $S_{XY1}$ corresponding to the pointing object according to the real-image candidate coordinate $RLOC_X$ and the virtual-image candidate coordinate $VLOC_1$, and records the output coordinate $S_{XY1}$ into the group of output coordinates $S_{XY}$. Since the real-image candidate coordinate $RLOC_1$ in FIG. 18 and the virtual-image candidate coordinate $VLOC_1$ in FIG. 19 represent the same location, and the real-image candidate coordinate $RLOC_4$ in FIG. 18 and the virtual-image candidate coordinate $VLOC_3$ in FIG. 19 represent the same location, the processing circuit 650 generates the group of output coordinates $S_{XY}$ corresponding to the pointing objects $O_1$, $O_2$ according to the real-image candidate coordinate $RLOC_1$ in FIG. 18, the virtual-image candidate coordinate $VLOC_1$ in FIG. 19, the real-image candidate coordinate $RLOC_4$ in FIG. 18, and the virtual-image candidate coordinate $VLOC_3$ in FIG. 19.

Figure 20:
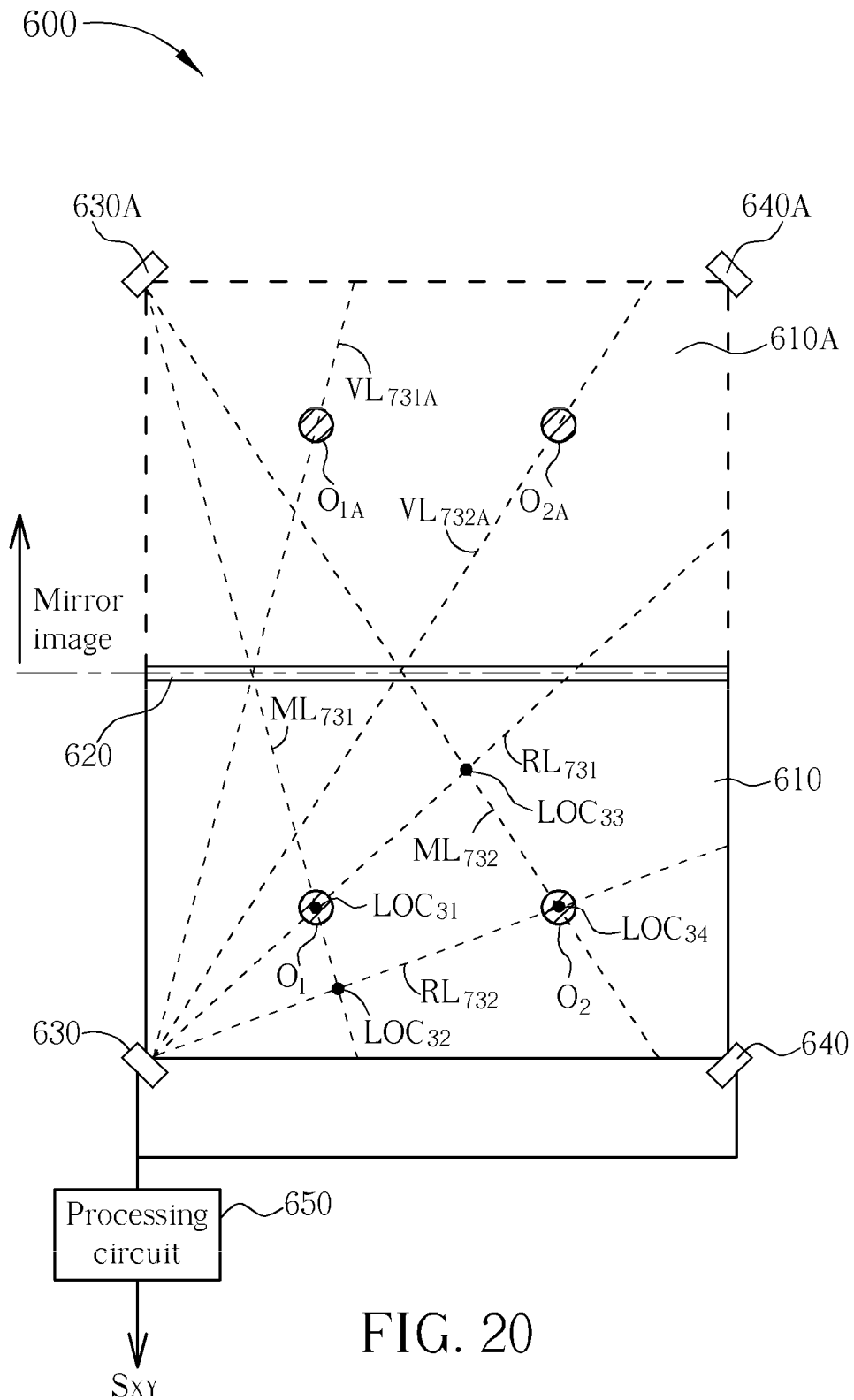
FIG. 20 and FIG. 21 are diagrams illustrating a method of the processing circuit calculating the locations of the pointing objects according to a fourth embodiment of the present invention.
Figure 21:
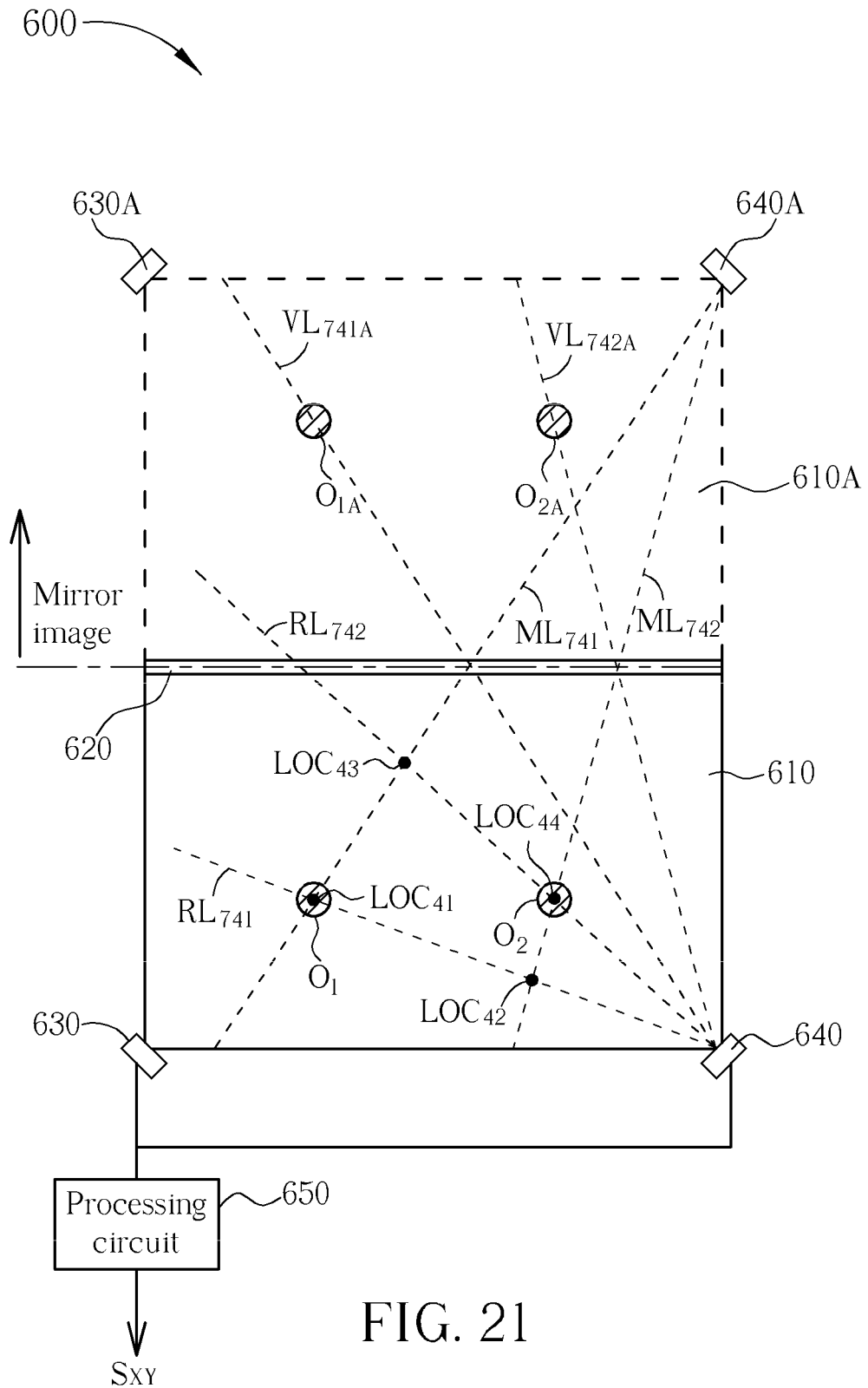

Please refer to FIG. 20 and FIG. 21. FIG. 20 and FIG. 21 are diagrams illustrating a method of the processing circuit 650 calculating the locations of the pointing objects according to a fourth embodiment of the present invention. In the present embodiment, the processing circuit 650 first determines which dark lines in the images 730 and 740 are real images and which dark lines in the images 730 and 740 are virtual images according to the above-mentioned method. The processing circuit 650 then generates a group of first candidate coordinates corresponding to the pointing objects $O_1$, $O_2$ according to the real images and the virtual images captured by the image-sensing device 630, and generates a group of second candidate coordinates corresponding to the pointing objects $O_1$, $O_2$ according to the real images and the virtual images captured by the image-sensing device 640. The processing circuit 650 compares the group of first candidate coordinates with the group of second candidate coordinates to generate the group of output coordinates $S_{XY}$ corresponding to the pointing objects $O_1$, $O_2$. The related operational principle is further illustrated in the following description.

In FIG. 20, the processing circuit 650 generates the real-image blocking lines $RL_{731}$ and $RL_{732}$ according to the real images captured by the image-sensing device 630 and the location of the image-sensing device 630, and the processing circuit 650 generates the virtual-image blocking lines $VL_{731A}$ and $VL_{732A}$ according to the virtual images captured by the image-sensing device 630 and the location of the image-sensing device 630. The processing circuit 650 generates the mirror-image lines $ML_{731}$ and $ML_{732}$ symmetrical to the virtual-image blocking lines $VL_{731A}$ and $VL_{732A}$ with respect to the reflective mirror 620 according to the virtual-image blocking lines $VL_{731A}$ and $VL_{732A}$ and the location of the image-sensing device 630A in the reflective mirror 620. In this way, the processing circuit 650 can generate the group of first candidate coordinates $LOC_{31}$-$LOC_{34}$ according to the crossing points of the real-image blocking lines $RL_{731}$ and $RL_{732}$, and the mirror-image lines $ML_{731}$ and $ML_{732}$, where the group of first candidate coordinates $LOC_{31}$-$LOC_{34}$ are the possible locations of the pointing objects $O_1$, $O_2$.

In FIG. 21, the processing circuit 650 generates the real-image blocking lines $RL_{741}$ and $RL_{742}$ according to the real images captured by the image-sensing device 640 and the location of the image-sensing device 640, and the processing circuit 650 generates the virtual-image blocking lines $VL_{741A}$ and $VL_{742A}$ according to the virtual images captured by the image-sensing device 640 and the location of the image-sensing device 640. The processing circuit 650 generates the mirror-image lines $ML_{741}$ and $ML_{742}$ symmetrical to the virtual-image blocking lines $VL_{741A}$ and $VL_{742A}$ with respect to the reflective mirror 620 according to the virtual-image blocking lines $VL_{741A}$ and $VL_{742A}$ and the location of the image-sensing device 640A in the reflective mirror 620. In this way, the processing circuit 650 can generate the group of second candidate coordinates $LOC_{41}$-$LOC_{44}$ according to the crossing points of the real-image blocking lines $RL_{741}$ and $RL_{742}$, and the mirror-image lines $ML_{741}$ and $ML_{742}$, where the group of second candidate coordinates $LOC_{41}$-$LOC_{44}$ are the possible locations of the pointing objects $O_1$, $O_2$.

The processing circuit 650 generates the group of output coordinates $S_{XY}$ corresponding to the pointing objects $O_1$, $O_2$ according to the coordinates included in the intersection of the group of first candidate coordinates $LOC_{31}$-$LOC_{34}$ and the group of second candidate coordinates $LOC_{41}$-$LOC_{44}$. For example, it can be seen in FIG. 20 and FIG. 21 that the first candidate coordinate $LOC_{31}$ and the second candidate coordinate $LOC_{41}$ represent the same location, and the first candidate coordinate $LOC_{34}$ and the second candidate coordinate $LOC_{44}$ represent the same location. Therefore, the intersection of the group of first candidate coordinates $LOC_{31}$-$LOC_{34}$ and the group of second candidate coordinates $LOC_{41}$-$LOC_{44}$ includes the coordinates $LOC_{31}$, $LOC_{34}$, $LOC_{41}$, and $LOC_{44}$. Actually, the coordinate $LOC_{31}$ (or $LOC_{44}$) represents the location of the pointing object $O_1$, and the coordinate $LOC_{34}$ (or $LOC_{44}$) represents the location of the pointing object $O_2$. Hence, the processing circuit 650 can generate the group of output coordinates $S_{XY}$ corresponding to the pointing objects $O_1$, $O_2$ according to the coordinates ($LOC_{31}$, $LOC_{34}$, $LOC_{41}$, and $LOC_{44}$) included in the intersection of the group of first candidate coordinates $LOC_{31}$-$LOC_{34}$ and the group of second candidate coordinates $LOC_{41}$-$LOC_{44}$.

In addition, the processing circuit 650 also can calculate the candidate distances between the group of first candidate coordinates $LOC_{31}$-$LOC_{34}$ and the group of the second candidate coordinates $LOC_{41}$-$LOC_{44}$ for determining the coordinates which are included in the first candidate coordinates $LOC_{31}$-$LOC_{34}$ and also included in the second candidate coordinates $LOC_{41}$-$LOC_{44}$ according to the length of the candidate distances, so as to generate the group of output coordinates $S_{XY}$ corresponding to the pointing objects $O_1$, $O_2$. More particularly, the processing circuit 650 calculates the candidate distances $D_{1\_1}$-$D_{1\_4}$ between the first candidate coordinate $LOC_{31}$ and the group of the second candidate coordinates $LOC_{41}$-$LOC_{44}$. When the candidate distance $D_{1\_X}$ is shorter than an error distance $D_{ERROR}$, the processing circuit 650 determines the first candidate coordinate $LOC_{31}$ and the second candidate coordinate $LOC_{4X}$ (for example, $LOC_{41}$) represent the same location, which indicates that a pointing object is located at the first candidate coordinate $LOC_{31}$ (or the second candidate coordinate $LOC_{41}$). As a result, the processing circuit 650 generates an output coordinate $S_{XY1}$ corresponding to the pointing object ($O_1$) according to the first candidate coordinate $LOC_{31}$ (or the second candidate coordinate $LOC_{41}$), and records the output coordinate $S_{XY1}$ into the group of output coordinates $S_{XY}$. For example, the processing circuit 650 can use the point at the middle of the first candidate coordinate $LOC_{31}$ and the second candidate coordinate $LOC_{41}$ as the output coordinate $S_{XY1}$. Similarly, the processing circuit 650 calculates the candidate distances $D_{4\_1}$-$D_{4\_4}$ between the first candidate coordinate $LOC_{34}$ and the group of the second candidate coordinates $LOC_{41}$-$LOC_{44}$. The candidate distance $D_{4\_4}$ between the first candidate coordinate $LOC_{34}$ and the second candidate coordinate $LOC_{44}$ is shorter than the error distance $D_{ERROR}$, which indicates that a pointing object is located at the first candidate coordinate $LOC_{34}$ (or the second candidate coordinate $LOC_{44}$). In this way, the processing circuit 650 generates an output coordinate $S_{XY2}$ corresponding to the pointing object ($O_2$) according to the first candidate coordinate $LOC_{34}$ and the second candidate coordinate $LOC_{44}$. Consequently, it can be seen according to the above description that the processing circuit 650 can generate the group of the output coordinates $S_{XY}$ corresponding to the pointing objects $O_1$, $O_2$ according to the group of first candidate coordinates $LOC_{31}$-$LOC_{34}$ and the group of second candidate coordinates $LOC_{41}$-$LOC_{44}$.

Figure 22:
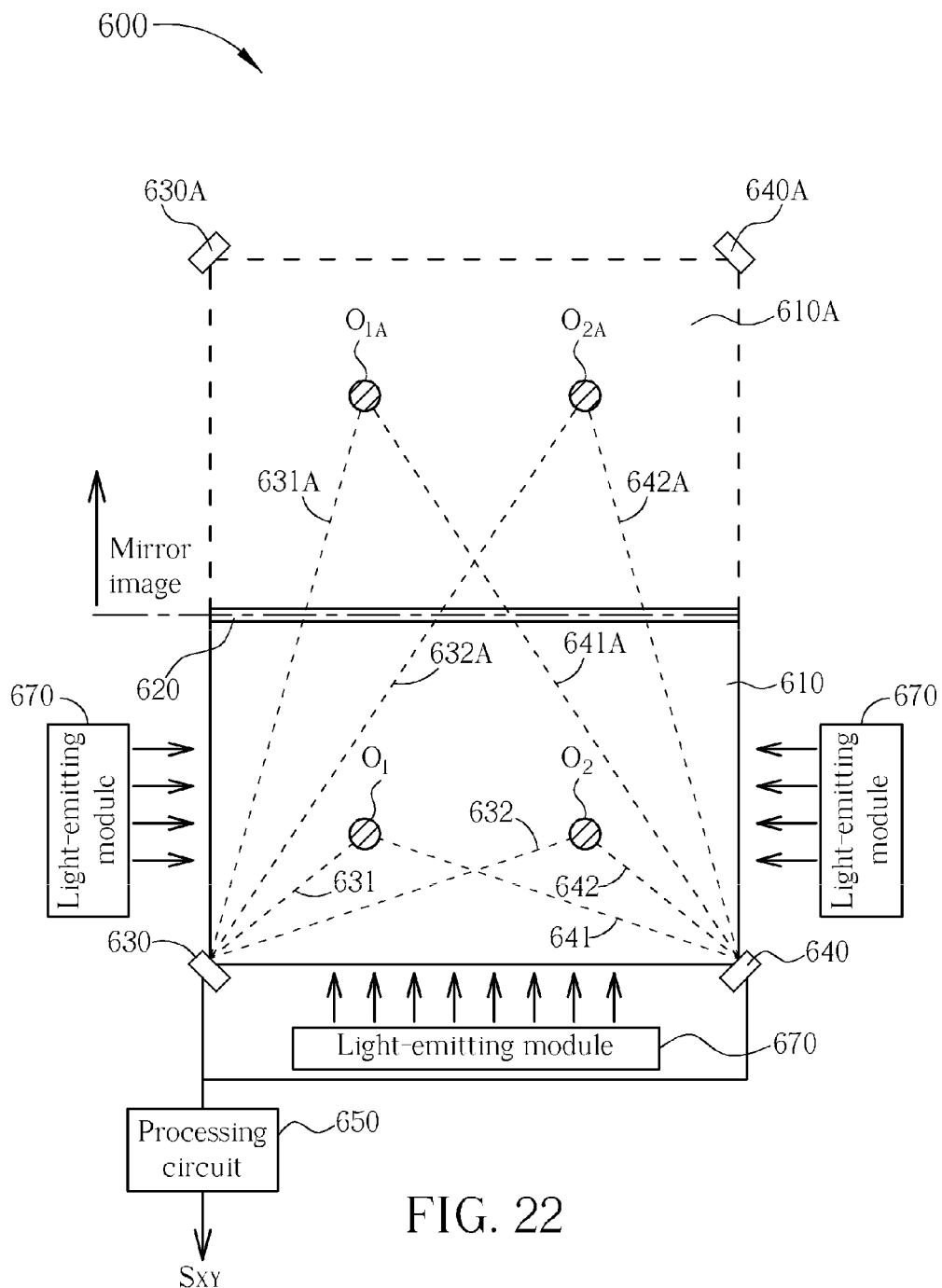
FIG. 22 is a diagram illustrating the optical sensing system according to another embodiment of the present invention.

In addition, please refer to FIG. 22. FIG. 22 is a diagram illustrating the optical sensing system 600 according to another embodiment of the present invention. In the present embodiment, the optical sensing system 600 further includes a light-emitting module 670. The light-emitting module 670 emits infrared light to the sensing area 610. In the present embodiment, both the image-sensing devices 630 and 640 are infrared light sensing devices. The image-sensing devices 630 and 640 receive infrared light to capture the images, including the real images of the pointing objects in the sensing area 610 and the virtual images of the pointing objects in the reflective mirror 620. In this way, disturbance due to background light is reduced, so that the processing circuit 650 can more correctly determine the locations of the dark lines in the images captured by the image-sensing devices 630 and 640. Thus, the processing circuit 650 can more correctly calculate the locations of the pointing objects.

In conclusion, the optical sensing system provided by the present invention includes a sensing area, a reflective mirror, a first image-sensing device, a second image-sensing device, and a processing circuit. The sensing area is a region in which a plurality of pointing objects may perform touch operation. The reflective mirror generates the mirror image of the sensing area. The first image-sensing device and the second image-sensing device respectively capture images including all or part of the pointing objects in the sensing area, and all or part of the pointing objects in the reflective mirror. The present invention provides four embodiments for the processing circuit to generate candidate coordinates according to the images captured by the first image-sensing device and the second image-sensing device, and obtains the locations of the pointing objects from the candidate coordinates by means of the symmetric relationship between the point objects and the corresponding mirror images with respect to the reflective mirror. In this way, the optical sensing system provided by the present invention can perform multi-touch operation.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An optical sensing system, comprising:
a sensing area having a plurality of sides, wherein a plurality of pointing objects execute touch operation within the sensing area;
a reflective mirror generating a mirror image of the sensing area;
a first image-sensing device capturing a first group of real images having all or part of the pointing objects, and a first group of virtual images having all or part of the pointing objects in the reflective mirror;
a second image-sensing device capturing a second group of real images having all or part of the pointing objects, and a second group of virtual images having all or part of the pointing objects in the reflective mirror; and
a processing circuit generating a group of real-image candidate coordinates corresponding to the plurality of pointing objects according to the first group of real images and the second group of real images, and generating a group of virtual-image candidate coordinates corresponding to the plurality of pointing objects according to the first group of virtual images and the second group of virtual images, the processing circuit generating a group of output coordinates corresponding to the plurality of pointing objects according to the group of real-image candidate coordinates and the group of virtual-image candidate coordinates.

2. The optical sensing system of claim 1, wherein the processing circuit determines the first group of real images and the first group of virtual images from images captured by the first image-sensing device according to sequence of the plurality of pointing objects forming images in the images captured by the first image-sensing device, and the processing circuit determines the second group of real images and the second group of virtual images from images captured by the second image-sensing device according to sequence of the plurality of pointing objects forming images in the images captured by the second image-sensing device.

3. The optical sensing system of claim 1, wherein the processing circuit generates a first group of real-image blocking lines according to a location of the first image-sensing device and the first group of real images, and generates a second group of real-image blocking lines according to a location of the second image-sensing device and the second group of real images;
wherein the processing circuit generates a first group of virtual-image blocking lines according to the location of the first image-sensing device and the first group of virtual images, and generates a second group of real-image blocking lines according to the location of the second image-sensing device and the second group of virtual images;
wherein the processing circuit generates the group of real-image candidate coordinates corresponding to the plurality of pointing objects according to crossing points of the first group of real-image blocking lines and the second group of real-image blocking lines, and the processing circuit generates the group of virtual-image candidate coordinates corresponding to the plurality of pointing objects according to crossing points of the first group of virtual-image blocking lines and the second group of virtual-image blocking lines.

4. The optical sensing system of claim 1, wherein the processing circuit detects symmetric relationship between the group of real-image candidate coordinates and the group of virtual-image candidate coordinates with respect to the reflective mirror;

wherein when the processing circuit determines a real-image candidate coordinate of the group of real-image candidate coordinates is symmetrical to a virtual-image candidate coordinate of the group of virtual-image candidate coordinates with respect to the reflective mirror, the processing circuit generates an output coordinate corresponding to a pointing object of the plurality of pointing objects according to the real-image candidate coordinate of the group of real-image candidate coordinates.

5. The optical sensing system of claim 1, further comprising:
a lighting module emitting light to the sensing area;
wherein the lighting module emits infrared light, and both the first image-sensing device and second image-sensing device are infrared light sensing devices.

6. An optical sensing system, comprising:
a sensing area having a plurality of sides, wherein a plurality of pointing objects execute touch operation within the sensing area;
a mirror-surface light-guiding component having a light-emitting surface facing the sensing area, a mirror surface facing the light-emitting surface and generating a mirror image of the sensing area, and a light-receiving surface, the light-emitting surface emitting light to the sensing area when the light-receiving surface receives light;
a light-emitting component emitting light to the light-receiving surface of the mirror-surface light-guiding component in a light-emitting period;
a first image-sensing device capturing a first group of real images having all or part of the pointing objects in the light-emitting period, and capturing the first group of real images and a first group of virtual images having all or part of the pointing objects in the mirror surface in a non-light-emitting period;
a second image-sensing device capturing a second group of real images having all or part of the pointing objects in the light-emitting period, and capturing the second group of real images and a second group of virtual images having all or part of the pointing objects in the mirror surface in the non-light-emitting period; and
a processing circuit generating a group of real-image candidate coordinates corresponding to the plurality of pointing objects according to the first group of real images and the second group of real images, and generating a group of virtual-image candidate coordinates corresponding to the plurality of pointing objects according to the first group of virtual images and the second group of virtual images, the processing circuit generating a group of output coordinates corresponding to the plurality of pointing objects according to the group of real-image candidate coordinates and the group of virtual-image candidate coordinates.

7. The optical sensing system of claim 6, wherein the processing circuit compares the first group of real images captured by the first image-sensing device in the light-emitting period and an image captured by the first image-sensing device in the non-light-emitting period to obtain the first group of virtual images from the image captured by the first image-sensing device in the non-light-emitting period;
wherein the processing circuit compares the second group of real images captured by the second image-sensing device in the light-emitting period and an image captured by the second image-sensing device in the non-light-emitting period to obtain the second group of virtual images from the image captured by the second image-sensing device in the non-light-emitting period.

8. The optical sensing system of claim 6, wherein the processing circuit generates a first group of real-image blocking lines according to a location of the first image-sensing device and the first group of real images, and generates a second group of real-image blocking lines according to a location of the second image-sensing device and the second group of real images;
wherein the processing circuit generates a first group of virtual-image blocking lines according to the location of the first image-sensing device and the first group of virtual images, and generates a second group of real-image blocking lines according to the location of the second image-sensing device and the second group of virtual images;
wherein the processing circuit generates the group of real-image candidate coordinates corresponding to the plurality of pointing objects according to crossing points of the first group of real-image blocking lines and the second group of real-image blocking lines, and the processing circuit generates the group of virtual-image candidate coordinates corresponding to the plurality of pointing objects according to crossing points of the first group of virtual-image blocking lines and the second group of virtual-image blocking lines.

9. The optical sensing system of claim 6, wherein the processing circuit detects symmetric relationship between the group of real-image candidate coordinates and the group of virtual-image candidate coordinates with respect to the reflective mirror;
wherein when the processing circuit determines a real-image candidate coordinate of the group of real-image candidate coordinates is symmetrical to a virtual-image candidate coordinate of the group of virtual-image candidate coordinates with respect to the reflective mirror, the processing circuit generates an output coordinate corresponding to a pointing object of the plurality of pointing objects according to the real-image candidate coordinate of the group of real-image candidate coordinates.

10. The optical sensing system of claim 6, further comprising:
a lighting module emitting light to the sensing area;
wherein the lighting module emits infrared light, and both the first image-sensing device and second image-sensing device are infrared light sensing devices.

11. An optical sensing system, comprising:
a sensing area having a plurality of sides, wherein a plurality of pointing objects execute touch operation within the sensing area;
a reflective mirror generating a mirror image of the sensing area;
a first image-sensing device capturing a first image having all or part of the pointing objects, and a first group of virtual images having all or part of the pointing objects in the reflective mirror;
a second image-sensing device capturing a second image having all or part of the pointing objects and a second group of virtual images having all or part of the pointing objects in the reflective mirror; and
a processing circuit generating a first group of blocking lines according to the first image and a location of the first image-sensing device, and generating a second group of blocking lines according to the second image and a location of the second image-sensing device, the processing circuit generating a group of candidate coordinates corresponding to the plurality of pointing objects according to the first group of blocking lines and the second group of blocking lines, and generating a group of output coordinates corresponding to the plurality of pointing objects according to the group of candidate coordinates and a location of the reflective mirror.

12. The optical sensing system of claim 11, wherein the processing circuit generates a group of real-image candidate coordinates in the sensing area and a group of virtual-image candidate coordinates in the mirror image generated by the reflective mirror according to the group of candidate coordinates corresponding to the plurality of pointing objects and the location of the reflective mirror.

13. The optical sensing system of claim 12, wherein the processing circuit detects symmetric relationship between the group of real-image candidate coordinates and the group of virtual-image candidate coordinates with respect to the reflective mirror;
    wherein when the processing circuit determines a real-image candidate coordinate of the group of real-image candidate coordinates is symmetrical to a virtual-image candidate coordinate of the group of virtual-image candidate coordinates with respect to the reflective mirror, the processing circuit generates an output coordinate corresponding to a pointing object of the plurality of pointing objects according to the real-image candidate coordinate of the group of real-image candidate coordinates.

14. The optical sensing system of claim 13, the processing circuit calculates a virtual-image distance between the virtual candidate coordinate of the group of virtual candidate coordinates and the reflective mirror, and generates a candidate line connected between the real-image candidate coordinate of the group of real-image candidate coordinates and the virtual-image candidate coordinate of the group of virtual-image candidate coordinates;
    wherein when length of the candidate line is substantially twice that of the virtual-image distance, and the candidate line is perpendicular to the reflective mirror, the processing circuit determines the real-image candidate coordinate of the group of real-image candidate coordinates is symmetrical to the virtual-image candidate coordinate of the group of virtual-image candidate coordinates with respect to the reflective mirror.

15. The optical sensing system of claim 11, wherein the processing circuit generates a first group of mirror-image lines according to the first group of blocking lines and a location of a mirror image of the first image-sensing device, and generates a second group of mirror-image lines according to the second group of blocking lines and a location of a mirror image of the second image-sensing device;
    wherein the processing circuit generates a group of first candidate coordinates in the sensing area according to the first group of blocking lines and the second group of blocking lines, and generates a group of second candidate coordinates in the sensing area according to the first group of mirror-image lines and the second group of mirror-image lines;
    wherein the processing circuit generates the group of output coordinates corresponding to the plurality of pointing objects according to the group of first candidate coordinates and the group of second candidate coordinates.

16. The optical sensing system of claim 15, wherein the processing circuit calculates a candidate distance between a first candidate coordinate of the group of first candidate coordinates and a second candidate coordinate of the group of second candidate coordinates;
    wherein when the candidate distance is shorter than an error distance, the processing circuit generates an output coordinate corresponding to a pointing object of the plurality of pointing objects according to the first candidate coordinate of the group of first candidate coordinates and the second candidate coordinate of the group of second candidate coordinates.

17. The optical sensing system of claim 11, further comprising:
    a lighting module emitting light to the sensing area;
    wherein the lighting module emits infrared light, and both the first image-sensing device and second image-sensing device are infrared light sensing devices.

18. An optical sensing system, comprising:
    a sensing area having a plurality of sides, wherein a plurality of pointing objects execute touch operation within the sensing area;
    a reflective mirror generating a mirror image of the sensing area;
    a first image-sensing device capturing a first group of real images having all or part of the pointing objects, and a first group of virtual images having all or part of the pointing objects in the reflective mirror;
    a second image-sensing device capturing a second group of real images having all or part of the pointing objects, and a second group of virtual images having all or part of the pointing objects in the reflective mirror; and
    a processing circuit generating a group of first candidate coordinates corresponding to the plurality of pointing objects according to the first group of real images and the first group of virtual images, and generating a group of second candidate coordinates corresponding to the plurality of pointing objects according to the second group of real images and the second group of virtual images, the processing circuit generating a group of output coordinates corresponding to the plurality of pointing objects according to the group of first candidate coordinates and the group of second candidate coordinates.

19. The optical sensing system of claim 18, wherein the processing circuit determines the first group of real images and the first group of virtual images in images captured by the first image-sensing device according to sequence of the pointing objects forming images in the images captured by the first image-sensing device, and the processing circuit determines the second group of real images and the second group of virtual images from images captured by the second image-sensing device according to sequence of the pointing objects forming images in the images captured by the second image-sensing device.

20. The optical sensing system of claim 18, wherein the reflective mirror is a mirror-surface light-guiding component having a light-emitting surface facing the sensing area, a mirror surface facing the light-emitting surface and generating a mirror image of the sensing area, and a light-receiving surface, wherein the light-emitting surface emits light to the sensing area when the light-receiving surface receives light;
    wherein the optical sensing system further comprises:
        a light-emitting component emitting light to the light-receiving surface of the mirror-surface light-guiding component in a light-emitting period;
        wherein the first image-sensing device captures the first group of real images in the light-emitting period, and captures the first group of real images and the first group of virtual images in a non-light-emitting period;
        wherein the second image-sensing device captures the second group of real images in the light-emitting period, and captures the second group of real images and the second group of virtual images in the non-light-emitting period;

wherein the processing circuit compares the first group of real images captured by the first image-sensing device in the light-emitting period and an image captured by the first image-sensing device in the non-light-emitting period to obtain the first group of virtual images from the image captured by the first image-sensing device in the non-light-emitting period;

wherein the processing circuit compares the second group of real images captured by the second image-sensing device in the light-emitting period and an image captured by the second image-sensing device in the non-light-emitting period to obtain the second group of virtual images from the image captured by the second image-sensing device in the non-light-emitting period.

21. The optical sensing system of claim 18, wherein the processing circuit generates a first group of real-image blocking lines according to a location of the first image-sensing device and the first group of real images, and generates a first group of virtual-image blocking lines according to the location of the first image-sensing device and the first group of virtual images;

wherein the processing circuit generates a first group of mirror-image lines symmetrical to the first group of virtual-image blocking lines with respect to the reflective mirror according to the first group of virtual-image blocking lines and a location of a mirror image of the first image-sensing device;

wherein the processing circuit generates the group of first candidate coordinates according to the first group of real-image blocking lines and the first group of mirror-image lines;

wherein the processing circuit generates a second group of real-image blocking lines according to a location of the second image-sensing device and the second group of real images, and generates a second group of virtual-image blocking lines according to the location of the second image-sensing device and the second group of virtual images;

wherein the processing circuit generates a second group of mirror-image lines symmetrical to the second group of virtual-image blocking lines with respect to the reflective mirror according to the second group of virtual-image blocking lines and a location of a mirror image of the second image-sensing device;

wherein the processing circuit generates the group of the second candidate coordinates according to the second group of real-image blocking lines and the second group of mirror-image lines.

22. The optical sensing system of claim 21, wherein the processing circuit generates the group of output coordinates corresponding to the plurality of pointing objects according to coordinates included in an intersection of the group of the first candidate coordinates and the group of the second candidate coordinates.

23. The optical sensing system of claim 21, wherein the processing circuit calculates a candidate distance between a first candidate coordinate of the group of first candidate coordinates and a second candidate coordinate of the group of second candidate coordinates;

wherein when the candidate distance is shorter than an error distance, the processing circuit generates an output coordinate corresponding to a pointing object of the plurality of pointing objects according to the first candidate coordinate of the group of first candidate coordinates and the second candidate coordinate of the group of second candidate coordinates.

24. The optical sensing system of claim 18, further comprising:

a lighting module emitting light to the sensing area;

wherein the lighting module emits infrared light, and both the first image-sensing device and second image-sensing device are infrared light sensing devices.

* * * * *